US011839986B2

(12) United States Patent  (10) Patent No.: US 11,839,986 B2
Hallock et al.  (45) Date of Patent: Dec. 12, 2023

(54) SYSTEMS AND METHODS FOR ACTIVE PERCEPTION AND COORDINATION BETWEEN ROBOTIC VISION SYSTEMS AND MANIPULATORS

(71) Applicant: Ocado Innovation Limited, Hatfield (GB)

(72) Inventors: David Gabriel Hallock, San Francisco, CA (US); Youssef Zaky, San Francisco, CA (US); Gaurav Paruthi, San Francisco, CA (US); Bryan Tripp, Waterloo (CA); James Sterling Bergstra, Toronto (CA)

(73) Assignee: Ocado Innovation Limited, Hatfield (GB)

( * ) Notice: Subject to any disclaimer, the term of this patent is extended or adjusted under 35 U.S.C. 154(b) by 429 days.

(21) Appl. No.: 17/078,981

(22) Filed: Oct. 23, 2020

(65) Prior Publication Data
US 2021/0122053 A1  Apr. 29, 2021

Related U.S. Application Data

(60) Provisional application No. 62/926,278, filed on Oct. 25, 2019, provisional application No. 62/927,516, filed on Oct. 29, 2019.

(51) Int. Cl.
*B25J 9/16* (2006.01)
*G06T 7/20* (2017.01)
(Continued)

(52) U.S. Cl.
CPC ............ *B25J 9/1697* (2013.01); *B25J 9/163* (2013.01); *B25J 9/1669* (2013.01); *B25J 13/08* (2013.01);
(Continued)

(58) Field of Classification Search
CPC ........ B25J 9/1682; B25J 9/1697; B25J 9/163; B25J 9/1669; B25J 13/08; G06N 20/00; G06T 7/70; G06T 7/20; G06T 2207/10016; G06T 2207/20081; H04N 5/23299; H04N 5/2253; H04N 5/23296
See application file for complete search history.

(56) References Cited

U.S. PATENT DOCUMENTS 10,717,196 B2 * 7/2020 Yamazaki ................ B25J 9/163
10,981,272 B1 * 4/2021 Nagarajan .............. B25J 9/1669
(Continued)

*Primary Examiner* — Jeff A Burke
*Assistant Examiner* — Joshua Alexander Garza
(74) *Attorney, Agent, or Firm* — SEED INTELLECTUAL PROPERTY LAW GROUP LLP

(57) ABSTRACT

The present disclosure generally relates to a robotic control system and method that utilizes active perception to gather the relevant information related to a robot, a robotic environment, and objects within the environment, and allows the robot to focus computational resources where needed, such as for manipulating an object. The present disclosure also enables viewing and analyzing objects from different distances and viewpoints, providing a rich visual experience from which the robot can learn abstract representations of the environment. Inspired by the primate visual-motor system, the present disclosure leverages the benefits of active perception to accomplish manipulation tasks using human-like hand-eye coordination.

21 Claims, 17 Drawing Sheets

(51) Int. Cl.
  *B25J 13/08* (2006.01)
  *G06N 20/00* (2019.01)
  *G06T 7/70* (2017.01)
  *H04N 23/54* (2023.01)
  *H04N 23/69* (2023.01)
  *H04N 23/695* (2023.01)

(52) U.S. Cl.
  CPC ............... *G06N 20/00* (2019.01); *G06T 7/20* (2013.01); *G06T 7/70* (2017.01); *H04N 23/54* (2023.01); *H04N 23/69* (2023.01); *H04N 23/695* (2023.01); *G06T 2207/10016* (2013.01); *G06T 2207/20081* (2013.01)

(56) References Cited

U.S. PATENT DOCUMENTS

| | | | |
|---|---|---|---|
| 2007/0073439 A1* | 3/2007 | Habibi | G05B 19/4182 700/213 |
| 2019/0038362 A1* | 2/2019 | Nash | H04N 13/239 |
| 2019/0126487 A1* | 5/2019 | Benaim | G06T 1/0014 |
| 2019/0291277 A1* | 9/2019 | Oleynik | B25J 9/1697 |
| 2020/0078939 A1 | 3/2020 | Jeong et al. | |
| 2020/0108505 A1* | 4/2020 | Sugiura | B25J 11/00 |
| 2020/0331144 A1* | 10/2020 | Huang | B25J 9/1697 |
| 2020/0406465 A1* | 12/2020 | Terasawa | G01B 11/00 |
| 2021/0362342 A1* | 11/2021 | Kariotoglou | B25J 9/1697 |

\* cited by examiner

SYSTEMS AND METHODS FOR ACTIVE PERCEPTION AND COORDINATION BETWEEN ROBOTIC VISION SYSTEMS AND MANIPULATORS

CROSS-REFERENCE TO RELATED APPLICATION

This application is related to, and claims benefit of and priority from Provisional Application No. 62/926,278 filed Oct. 25, 2019, as well as Provisional Application No. 62/927,516 filed Oct. 29, 2019, the complete subject matter of which are hereby incorporated herein by reference in their entireties.

BACKGROUND

Field

Embodiments of the present disclosure relate generally to the field of robotic control, and methods thereof, used to coordinate robotic movements based to achieve a human-like hand-eye coordination between a robotic controller and a robotic vision system.

Description of Related Art

Currently, robotic control systems used for grasping and handling objects rely on multiple sensors to achieve coordination between a robot and the objects within a three-dimensional workspace. Common sensors used in robotic control systems can include motion sensors, distance and proximity sensors, vibration sensors, transducers and pressure sensors, accelerometers, gyroscopes, altimeters, and the like. The use of numerous sensors for robotic control presents a number of drawbacks, including system lag due to processing requirements of data from multiple sensors, network bandwidth constraints and delayed control response times, and increased system implementation and maintenance costs. In addition, the use of multiple sensors can lead to possible inaccuracies in the robotic control stemming from improper sensor calibration, sensor errors and failure, and false positive sensor readings.

Furthermore, in conventional systems, existing scan tunnels, vision sensors, and cameras are focused on a particular field of view in a workspace, and are typically fixed and non-moving. Fixed cameras are limited in terms of the potential field of view that can be obtained, and re-location of fixed cameras can be difficult, time consuming and manually-intensive (i.e., not capable of real-time or on-the-fly re-location). In addition, in order for such a robotic control system to accurately capture an entire scene within a workspace, multiple fixed cameras positioned at different viewing angles are required, thereby increasing system costs.

In addition, conventional robotic control systems that utilize cameras do not provide localized tracking of a specific area of an object being manipulated by a robot. A lack of such coordination between the robot and an imaging system prevents human-like hand-eye coordination functionality. Hand-eye calibration denotes a method for determining the spatial transformation between a robot component, such as a hand or gripper, and a camera which is configured to obtain a desired image using visual motion technology.

Therefore, there is a need for a robotic control system that requires less sensors than conventional systems, and which utilizes a dynamically adjustable imaging system, in order to provide a human-like hand-eye coordination between a robotic controller and a robotic vision system, to perform object localization, to learn state representations, and to perform goal-directed actions.

SUMMARY

In an embodiment, the present invention relates to a robotic control system that utilizes active coordination to track an object, comprising: a robot having an end-effector; an imaging device configured to track a region of interest on the object; and least one processor communicatively coupled to the robot and the imaging device, wherein the processor is configured to analyze operational data received from the robot and video data received from the imaging device, and the processor is configured to adjust the imaging device based on the analyzed operational data and video data, so that the region of interest continues to be tracked as the robot manipulates the object.

In another embodiment, the present invention relates to a method for active coordination of a robot control system, comprising: receiving, by a processor, a video feed captured from an imaging device; analyzing, by the processor, the video feed to determine if a region of interest on an object being manipulated by a robot is tracked by the imaging device; responsive to determining that the region of interest is being tracked, adjusting at least one of the imaging device and the robot, by the processor, so that the region of interest continues to be tracked; and responsive to determining that the region of interest is not being tracked, adjusting at least one of the imaging device and the robot, by the processor, so that the region of interest starts to be tracked.

In yet another an embodiment, the present invention relates to a method for training a machine learning system for active coordination of a robot and an imaging system, comprising: a video feed of the robot grasping an object by the imaging system receiving the video feed by a machine learning system communicatively coupled to the imaging system and the robot; analyzing the video feed by the machine learning system to determine a grasp location relative to the object; instructing the robot to grasp the object at a fixation location, wherein the fixation location is different than the grasp location; instructing the imaging system to adjust such that the video feed contains a field of view containing the fixation location; analyzing, by the machine learning system, the video feed to determine whether the robot successfully grasps the object at the fixation location; and creating a grasping policy for use at a subsequent manipulation by the robot responsive to determining that the robot successfully grasped the object at the fixation location.

BRIEF DESCRIPTION OF THE DRAWINGS

These and other embodiments of the disclosure will be discussed with reference to the following exemplary and non-limiting illustrations, in which like elements are numbered similarly, and where.

DEFINITIONS

Figure 1:
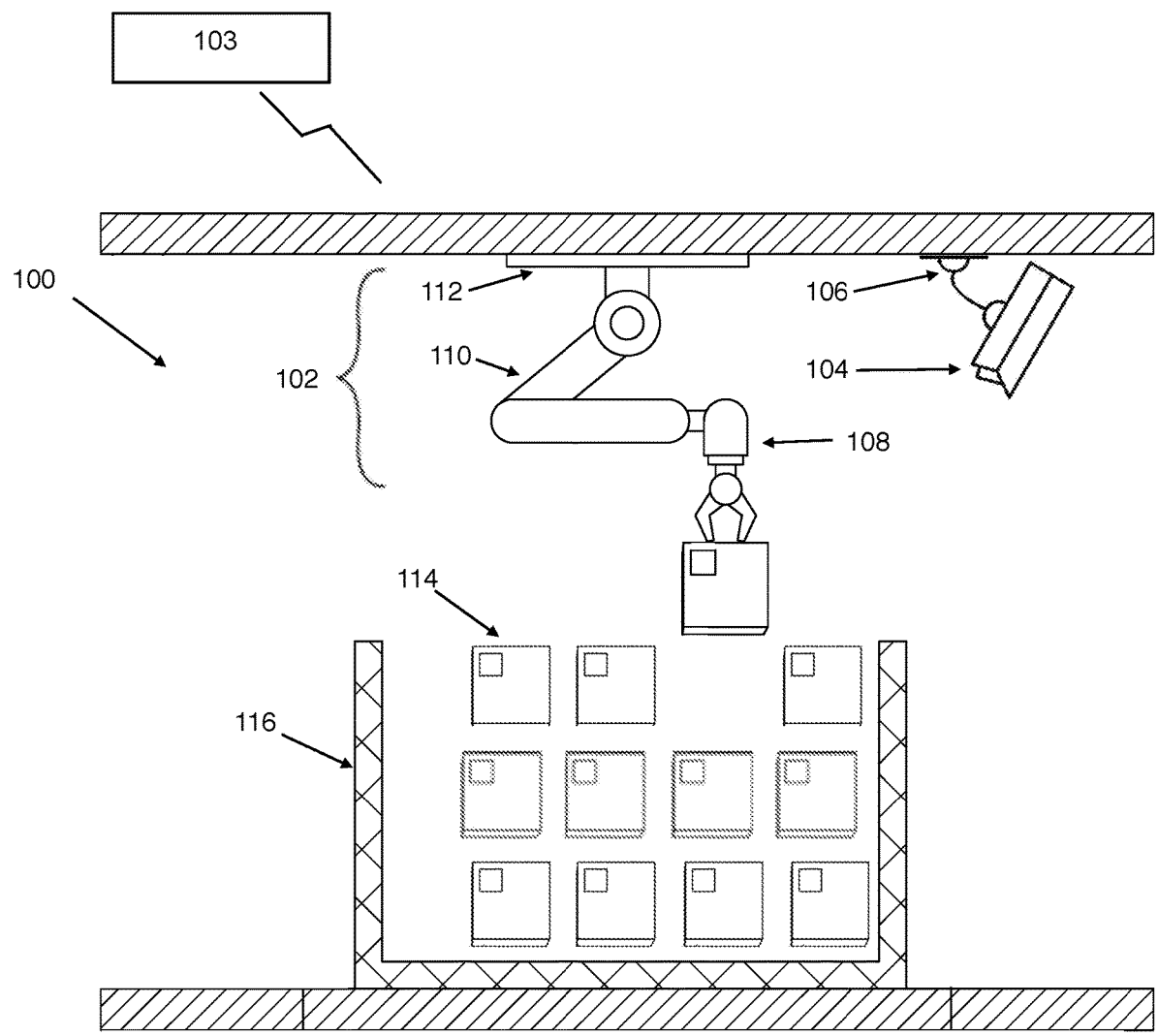
FIG. 1 is a schematic diagram illustrating a robot and a robotic control system with an imaging device within a workspace, according to an embodiment of the invention.

The following definitions are meant to aid in the description and understanding of the defined terms in the context of the invention. The definitions are not meant to limit these terms to less than is described throughout this application. Such definitions are meant to encompass grammatical equivalents.

As used herein, the term "workspace" can refer to, for example, a shipment fulfillment site, a manufacturing site, a retail location, a construction site, a factory, a farming site, an animal husbandry site, a warehouse, an inventory storage facility, a mail processing facility, a distribution center, a cargo receiving/loading dock, a maritime port, an airport, a medical facility, a library, a document and/or materials archive facility, long- and short-term storage facilities, a vault, and/or any other site or location that includes a conveyor belt system, an assembly line, a pick-and-place system, a sorting system, a routing system, and/or any other environment which may benefit from the use of robotic equipment or autonomous vehicles and/or machinery.

As used herein, the terms "vision system" and "vision systems" can refer to, for example, cameras such as stereoscopic vision systems, CCD cameras, CMOS, devices and systems capable of capturing video, imagery, and audio data, as well as capable of capturing data corresponding to radar, lidar, laser scanning, thermal, temperature, humidity, oxygen and gas levels, infrared, range imaging, ultrasound, x-ray, and/or physiological parameters, and combinations thereof. In addition, these terms can refer to various forms of cameras and sensors, such as dome cameras, bullet cameras, turret cameras, pinhole cameras, and the like.

As used herein, the term "gimbal" and "gimbals" can refer to, device and hardware stabilizing systems, movement control systems, orienting systems, a gyro-stabilized system, and the like, and which can include, but are not limited to, a servomechanism, single-axis gimbals, dual-axis gimbals, three-axis gimbals, iso-elastic systems, spring-based systems, stabilized cable suspended systems, a weight sled and weight plate systems, a heligimbal, a drone, a dolly, a tripod, a brace, a Steadicam®, a Glidecam®, a Skycam®, and combinations thereof.

As used herein, the term "wireless network" can refer to a wireless local area network, a wireless wide area network, a cloud-based network, short and long range radio and wireless communication protocols, such as Bluetooth®, Zigbee®, infrared, and radio frequency, a wireless fidelity network (WiFi), a wireless mesh network, a cellular network that may employ various technologies including enhanced data rates for global evolution (EDGE), general packet radio service (GPRS), global system for mobile communications (GSM), Internet protocol multimedia subsystem (IMS), universal mobile telecommunications system (UMTS), and the like, as well as any other suitable wireless medium, e.g., 3G, 4G, 5G, worldwide interoperability for microwave access (WiMAX), Long Term Evolution (LTE) networks, code division multiple access (CDMA), wideband code division multiple access (WCDMA), a satellite network, mobile ad-hoc network (MANET), and the like, or any combination thereof As used herein, the term "machine learning" can refer to, for example, deep learning, reinforcement learning, neural network computing, artificial intelligence computing, fuzzy logic computing, and the like.

DETAILED DESCRIPTION

It should be understood that aspects of the present disclosure are described herein with reference to the figures, which show illustrative embodiments. The illustrative embodiments herein are not necessarily intended to show all embodiments in accordance with the present disclosure, but rather are used to describe a few illustrative embodiments. Thus, aspects of the present disclosure are not intended to be construed narrowly in view of the illustrative embodiments.

FIG. 1 is a schematic diagram illustrating a robot 102 and a robotic control system 103 with an imaging device 104 within a workspace 100, according to an embodiment of the invention. In an embodiment, the robot 102 has an end-effector 108. In embodiment, the robot 102 can be affixed on, or incorporated with, a hanging articulating arm 110 that is mounted above the workspace 100 on a base 112, such as on, for example, a ceiling, support or crossbeam, a cantilevered beam, or a sidewall. In another embodiment, the robot 102 can be floor mounted, such as via a floor-standing pedestal, or can be wall-mounted.

In an embodiment, end-effector 108 is a robotic gripper having two or more gripping fingers, where each of the fingers can be actuated electrically, mechanically, and/or pneumatically. The fingers can be parallel fingers, jaws, adaptive fingers, hyper-adaptive fingers, and the like. In an embodiment, the end-effector 108 can include a vacuum suction mechanism, force-torque sensors, tooling, tool changers, spraying and discharging nozzles, magnets, and the like. The end-effector 108 can be similar to the end-effector described in commonly owned U.S. Non-Provisional patent application Ser. No. 16/565,186, the contents of which are incorporated herein by reference in its entirety.

In an embodiment, the end-effector 108 is configured to manipulate objects 114 located in, for example, a bin 116. In an embodiment, the end-effector 108 is configured to pick objects 114 from the bin 116 and place the objects 114 into a second area (not shown), such as in another bin, conveyor belt, loading bay, and the like. In an embodiment, the objects 114 can include objects of different shapes, sizes, dimensions, volumes, and weight. In another embodiment, the objects 114 can be uniform and relatively identical. The bin 116 is shown as an illustrative, non-limiting example of a sorting station, and a myriad of other sorting stations and equipment can be utilized within the scope of the invention.

In an embodiment, the end-effector 108 is capable of moving in a full 6-degrees of freedom (DoF), as well as 4-DoF and 8-DoF.

While FIG. 1 depicts a workspace 100 with a robot 102 configured for pick-and-place operations, it is understood that the system could be implemented in any setting where a robotic manipulator may be useful, such as in various stages in a supply chain, assembly line, manufacturing environment, storage and warehouse facility, sorting stations, laboratory, and retail and commercial settings.

In an embodiment, the imaging device 104 is mounted on a gimbal 106. The gimbal 106 can be a pivoting support that allows rotation of the imaging device 104 about multiple axes. For example, the gimbal 106 can be a three-axis gimbal that allows for stabilization of the tilt, pan, and roll of the imaging device 104. In an embodiment, the gimbal 106 can incorporate sensors such as, for example, inertial motion sensors, gyroscopes, and the like, that are used to stabilize and control the movement, orientation, and direction of the imaging device 104. The gimbal 106 can further include motors that compensate for unwanted movements of the imaging device 104, such as from unexpected shock, vibration, and the like from collision with surfaces, walls, objects 114, the robot 102, or any other human or structure that may be come into contact with the gimbal 106 or imaging device 104.

In an embodiment, the gimbal 106 can be manipulated in multiple degrees of freedom, such as 6-DoF movement and 8-DoF of movement (i.e., for example, by 6-DoF yaw gimbal coupled to a 2-DoF pan/tilt device).

In an embodiment, the gimbal 106 is mounted above the workspace 100, such as on, for example, a ceiling, support or crossbeam, a cantilevered beam, or a sidewall. In another embodiment, the gimbal 106 can be floor mounted, such as via a floor-standing pedestal, or can be wall-mounted. In yet another embodiment, the gimbal 106 can be mounted on the robot 102, such as on an arm 110, on the end-effector 108, or on the base 112.

In an embodiment, the gimbal 106 is mounted on a second end-effector (not shown), such as on a wrist portion of the second end-effector. The second end-effector can be used to change the viewpoint of the imaging device 104.

In another embodiment, the gimbal 106 is mounted on a track (not shown) affixed to the workspace 100, whereby the gimbal 106 can move along the track as desired to obtain a desired field of view.

In an embodiment, the imaging device 104 includes at least one camera. The camera can include a still video camera, still camera, a 360-degree camera, a camera having a panoramic lens, and the like. The camera can further include a thermal camera, an infrared camera, an x-ray camera which provides details on the contents of an object 114, and the like. In yet another embodiment, the camera can include functions such as zoom, pan, tilt, image color inverse, and the like. The camera can further include a telephoto lens, varifocal lens, a varifocal telephoto lens, and the like.

In an embodiment, the imaging device 104 can include capabilities such as night vision and/or infrared to enhance image capture in low-light conditions and environments.

In an embodiment, the imaging device 104 can have a frame rate of at least 40 frames per second (FPS) to more than 400 FPS. In a preferred embodiment, the imaging device 104 has a frame rate of at least 120 FPS.

In an embodiment, the imaging device 104 can include multiple cameras mounted on the gimbal 106. In another embodiment, the imaging device 104 includes an imaging system with multiple cameras, where each camera is mounted on a dedicated gimbal (not shown). In yet another embodiment, the imaging device 104 includes an imaging system with at least one camera mounted on the gimbal 106, and at least one camera located on a fixed or movable mount.

Figure 2:
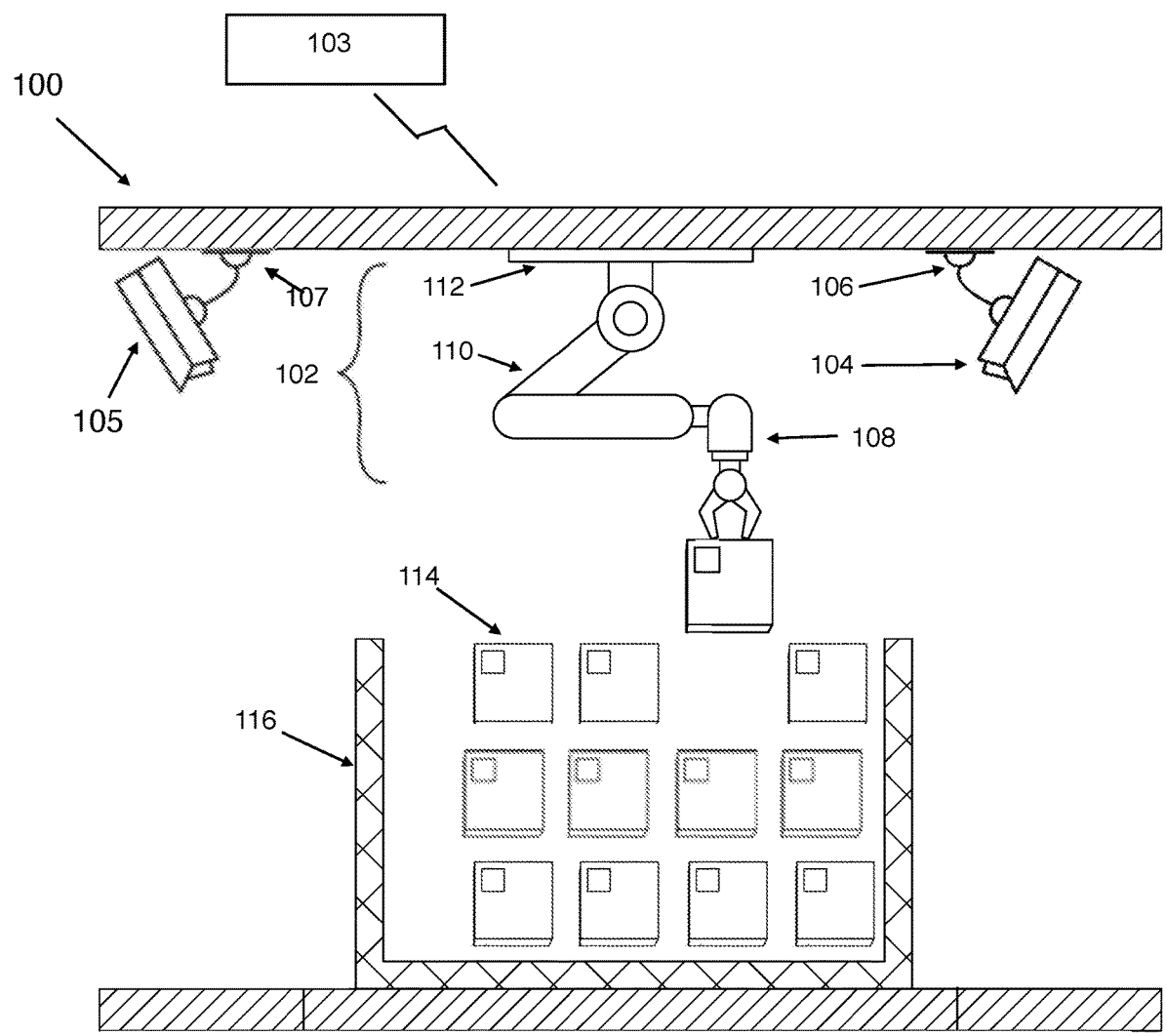
FIG. 2 is a schematic diagram illustrating a robot and a robotic control system with multiple imaging devices within a workspace, according to an embodiment of the invention.

FIG. 2 is a schematic diagram illustrating a robot 102 and a robotic control system 103 with multiple imaging devices 104, 105 within a workspace 100, according to an embodiment of the invention. In an embodiment, both imaging devices 104, 105 can be mounted on respective gimbals 106, 107 and each imaging device 104, 105 can be the same type of device, such as, for example, a video camera having a varifocal lens. In another embodiment, the each imaging device 104, 105 can be a different type of device. For example, imaging device 104 can be a camera having a varifocal lens, while imaging device 105 can be a thermal camera. In this embodiment, each imaging device 104, 105 can be utilized to sense, detect, and capture various types of data, such as visual and motion data of the end-effector 108 grasping an object 114, as well as thermal and heat properties of the object 114. Each imaging device 104, 105 can be independently controlled by the robotic control system 103 as described herein.

In yet another embodiment, imaging device 104 can be affixed to gimbal 106, and imaging device 105 can be mounted on another free-form device that allows a range of motion and views, such as, for example, a drone, a cable suspension system, and the like.

In another embodiment, each imaging device 104, 105 can track and capture a different region of interest. For example, imaging device 104 may be configured to track and capture a label on an object 114, while imaging device 105 may be configured to track and capture gripping fingers on the end-effector 108.

While FIG. 2 depicts a workspace with two imaging device 104, 105, it is understood that the robotic control system 103 can include any number of, and combinations of, imaging devices, and the present invention is not limited to the imaging devices 104, 105 shown in FIG. 2.

Figure 3:
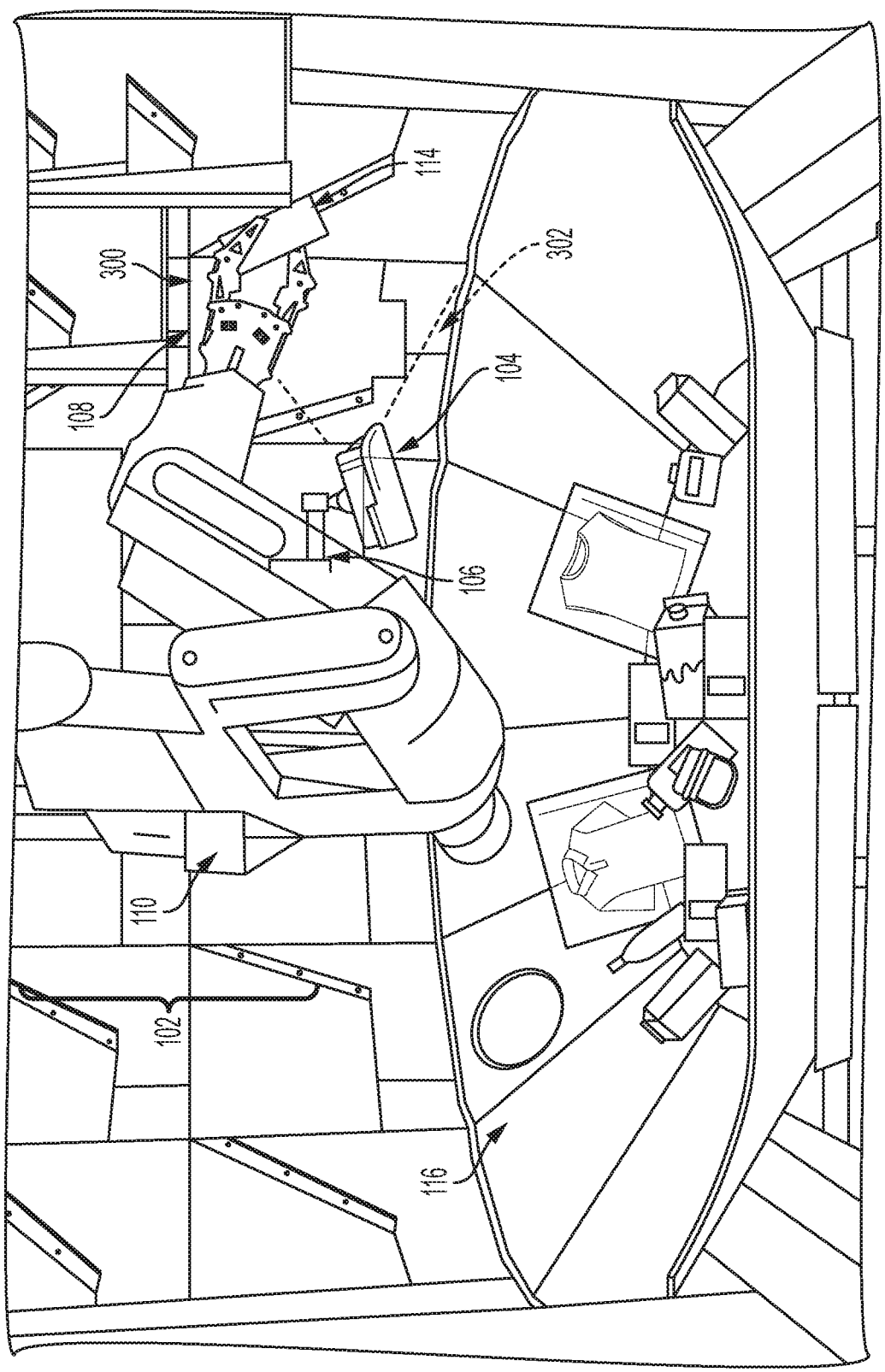
FIG. 3 is a perspective view of an imaging device located on an end-effector, according to an embodiment of the invention.

FIG. 3 is a perspective view of an imaging device 104 located on the robot 102, according to an embodiment of the invention. In an embodiment, the gimbal 106 is permanently or detachably affixed to robot 102. The gimbal 106 can be permanently or detachably mounted on the robotic arm 110, the end-effector 108, the base 112, or any other location on the robot 102. As the robot 102 is manipulated (i.e., moves relative to an object, grasps an object, etc.), the gimbal 106 adjusts the positioning of the imaging device 104 so that the field of view 302 of the imaging device 104 captures a region of interest, for example, the gripping fingers 300 grasping the object 114. The gripping fingers are shown as an illustrative, non-limiting example of tooling that can be affixed to the end-effector 108, and a myriad of other tooling and forms of end-effectors can be utilized.

In yet another embodiment, the gimbal 106 is mounted on a track (not shown) affixed to the robot 102, whereby the gimbal 106 can move along the track as desired to capture a region of interest.

In an embodiment, the bin 116 takes the form of a bowl which can hold objects 114. The bin 116 can be surrounded by, or located adjacent to, sorting stations, conveyor belts, transfer vehicles, additional bins, or other areas which the robot 102 can place objects 114 selected from the bin 116.

In an embodiment, the gimbal 106 can allow the imaging device 104 to swivel and rotate relative to the end-effector 108, as well as be moved in a 360-degree fashion in planes vertical to-and horizontal-to the end-effector 108. Such dynamic capabilities of the gimbal 106 allow any desired field of view 302 relative to the robot 102, end-effector 108, gripping fingers 300, and the object 114 to be captured.

In an embodiment where the gimbal 106 is detachably affixed to the end-effector 108, arm 110, or base 112 of the robot 102, a connector (not shown) can be used to secure the gimbal 106. Various connectors may be utilized, such as, for example, quick connect, push-to-pull, push-to-connect, push-in, push-fit, or instant fittings that can permit the gimbal 106 from being easily attached and/or removed with or without the use of tools. In this embodiment, different gimbals can be utilized on the robot 102 based on specific requirements, limitations, and the like, such as, for example, space constraints, strength requirements, etc.

In an embodiment, the imaging device 104 can be detachably affixed to the gimbal 106 using a connector (not shown). Similarly, various connectors may be utilized, such as, for example, quick connect, push-to-pull, push-to-connect, push-in, push-fit, or instant fittings that can permit the imaging device 104 from being easily attached and/or removed with or without the use of tools. In this embodiment, different imaging devices can be utilized on the gimbal 106 based on specific requirements, limitations, and the like, such as, for example, desired lens and resolution type, weight capabilities of the gimbal 106, space constraints, etc.

Figure 4:
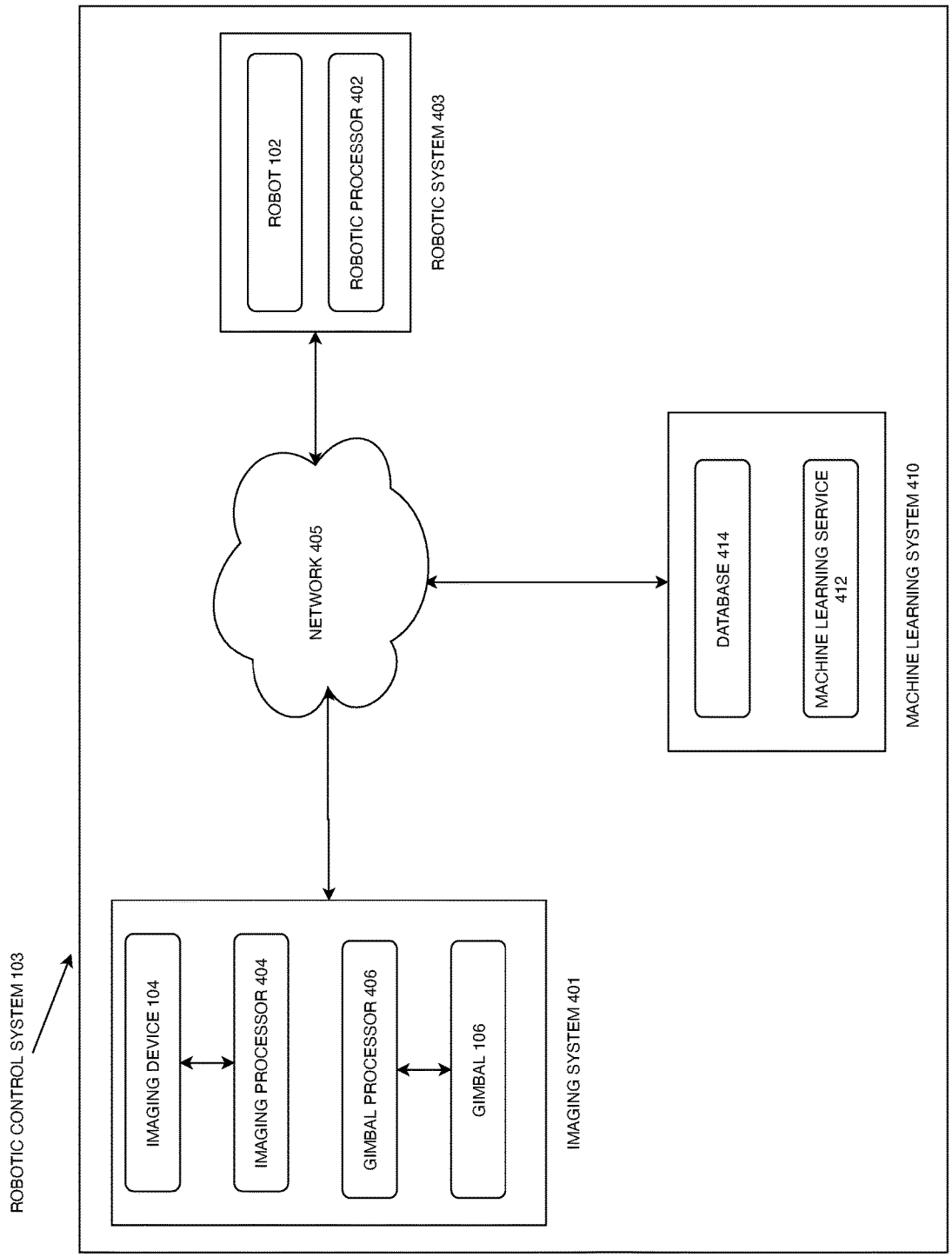
FIG. 4 is a network architecture diagram of a robotic control system, according to an embodiment of the invention.

FIG. 4 is a network architecture diagram of a robotic control system 103, according to an embodiment of the invention. In an embodiment, an imaging system 401, a robot system 403, and a machine learning system 410 are communicatively coupled to a wired and/or wireless network 405. In an embodiment, the imaging system 401 includes a gimbal processor 406 communicatively coupled to the gimbal 106, and an imaging processor 404 communicatively coupled to the imaging device 104. The robot system 403 includes a robot processor 402 communicatively coupled to the robot 102. The machine learning system 410 includes a machine learning service 412 and a database 414.

In an embodiment, the network 405 is a wireless network. In this embodiment, the imaging system 401 and the robot system 403 can include wireless transceivers capable of receiving and transmitting data over the wireless network.

In another embodiment, the network 405 is a hard-wired network where the imaging system 401 is coupled to the robot system 403 via wired links (not shown). The wired links can be, for example, high-definition (HD) over coaxial cabling that utilizes a split coaxial data cable and power cables, power-over-Ethernet (PoE) cabling that utilizes, for example, Cat5e or Cat6 Ethernet cable, BNC cabling, DIN cabling, RCA cabling, HDMI cabling, FireWire cabling, USB cabling, and any other type of suitable analog or digital cabling.

In an embodiment, one or more of the processors 402, 404, 406 can include a processing unit. The processing unit can include, but is not limited to, a vision processing unit (VPU), a graphic processing unit (GPU), a Tensor processing unit (TPU), an artificial intelligence accelerator application-specific integrated circuit (AI accelerator ASIC), a neural processing unit, a cognitive computing unit, a central processing unit (CPU), or one or more of any other purpose-built processor suitable for AI and Internet-of-Things (IoT) computing.

In an embodiment, one or more of the processors 402, 404, 406 can operate in a distributed fashion and share processing functions. For example, imaging processor 404 can be configured to perform required video processing and analysis functions, such as, but not limited to, object identification, portioning video feed segments, localizing objects within the video feed, redaction of non-relevant artifacts in the video feed, tagging of objects, trajectory and movement analysis, and the like. In an embodiment, robot processor 402 can be configured to perform some of the required video processing and analysis functions, and the remaining functions can be performed by imaging processor 404.

In an embodiment, one or more of the processors 402, 404, 406 can intelligently determine the functions that it will perform, based on, for example, the amount of available processing resources, anticipated latency, anticipated bandwidth required, available bandwidth, and the like.

In an embodiment, one or more of the processors 402, 404, 406 can include video and image compression and coding processors. For example, captured video data can be compressed, such as by, for example, the use of high efficiency video coding (HEVC), also known as H.265 and MPEG-H Part 2, or advanced video coding (AVC), also known as H.264 and MPEG-4 Part 10.

In an embodiment, robot processor 402 can be located remotely from the robot 102, such that the robot system 403 is a distributed system. In this embodiment, the robot system 403 and imaging system 401 can be located at a first location, such as a factory or warehouse, and the robot processor 402 can be located at a second location, such as at a teleoperation center, remote monitoring center, a remote server, a cloud location, and the like.

In an embodiment, the machine learning system 410 can receive various operational data from the imaging system 401 and the robot system 403. Such data can include, but is not limited to, yaw, pitch, roll, acceleration, motion, orientation, load, strain, stress, fatigue, health, field of view, resolution, zoom, and the like. In addition, the data can include information related to an object or objects, such as weight, dimensions, edges, contours, colors, volume, flexibility, hardness, softness, durometer values, slippage while grasped by the end-effector 108, occlusion of the object while being grasped by the end-effector 108, and the like.

The robot processor 402 can also receive this various operational data and generate commands for the robot 102, the gimbal processor 406, and/or the imaging processor 404. In an embodiment, the processing functions for multiple devices 102, 104, 106 can be combined into a single processor, or distributed within a shared processing unit or system, as described in more detail in FIG. 9.

In yet another embodiment, the processors 402, 404, 406 can each be located locally or integrally within their respective devices 102, 104, 106. In this embodiment, each processor 402, 404, 406 can communicate with the other processors using wireless or wired communication links.

In an embodiment, the machine learning system 410 is configured to receive and process the operational data. The received operational data and generated analysis can be stored on the database 414. In an embodiment, the database 414 can be a relational database, a SQL database, an object-oriented database, a centralized database, or a distributed database, such as a cloud-based database or a blockchain-based database stored across a distributed ledger.

In an embodiment, the machine learning system 410 may apply one or more machine learning algorithms to the operational data analyzed by one or more processors 402, 404, 406. Specifically, the machine learning system 410 can analyze time-varying parameters of the operational data to determine pose geometries for the robot 102 and/or gimbal 106 that allows a region of interest on the object 114 to be tracked and captured by the imaging device 104. The machine learning system 410 can utilize operational data collected over a period of time in order to predict such pose geometries based on the type(s) of objects in the workspace 100, as well as based on the particular type of robot 102 and end-effector 108 being utilized. Such algorithms are described in more detail herein with respect to FIG. 9.

For example, consider a scenario where operational data of the robot 102 with gripping fingers 300 used to pick-and-place polybags is collected over time. The machine learning system 410 can analyze this operational data to determine whether various captured pose geometries of the robot 102, end-effector 108, imaging device 104 and/or gimbal 106 allow for a particular region of interest of the polybag to tracked and captured by the imaging device 104, while the polybag is being manipulated by the end-effector 108. In an embodiment, by tracking the region of interest on the polybag, the robotic control system 103 can manipulate the polybag similar to how a human brain processes information from viewing its own hands while manipulating an object.

In an embodiment, the region of interest can be predetermined or selected by an operator once the end-effector 108 has grasped an object 114. For example, the operator can manually select a region on the object 114 via an interface to indicate a field of view or area of the object and/or workspace that should be tracked and captured by the imaging device 104. In an embodiment, the operator is a local operator, or a teleoperator.

In another embodiment, instead of, or in addition to, selecting a specific region on the object 114, the operator can indicate that certain markings, identifiers, labels, tags, features, trademarks, serial numbers, and the like be tracked and captured by the imaging device 104. For example, the operator can specify that a Universal Product Code (UPC) be tracked and captured for each object 114. In this embodiment, the imaging processor 404 and/or robot processor 402 can utilize various techniques, such as object identification, object segmentation, and background filtering to locate a UPC tag on the object 114.

Tracking the region of interest for a particular type of object allows for various functions to be performed on the object 114 by the robot 102, such as, for example, facilitating scanning of labels and tags on the object 114, orienting the object 114 for placement, stowing, stacking, and the like, etc.

Figure 5:
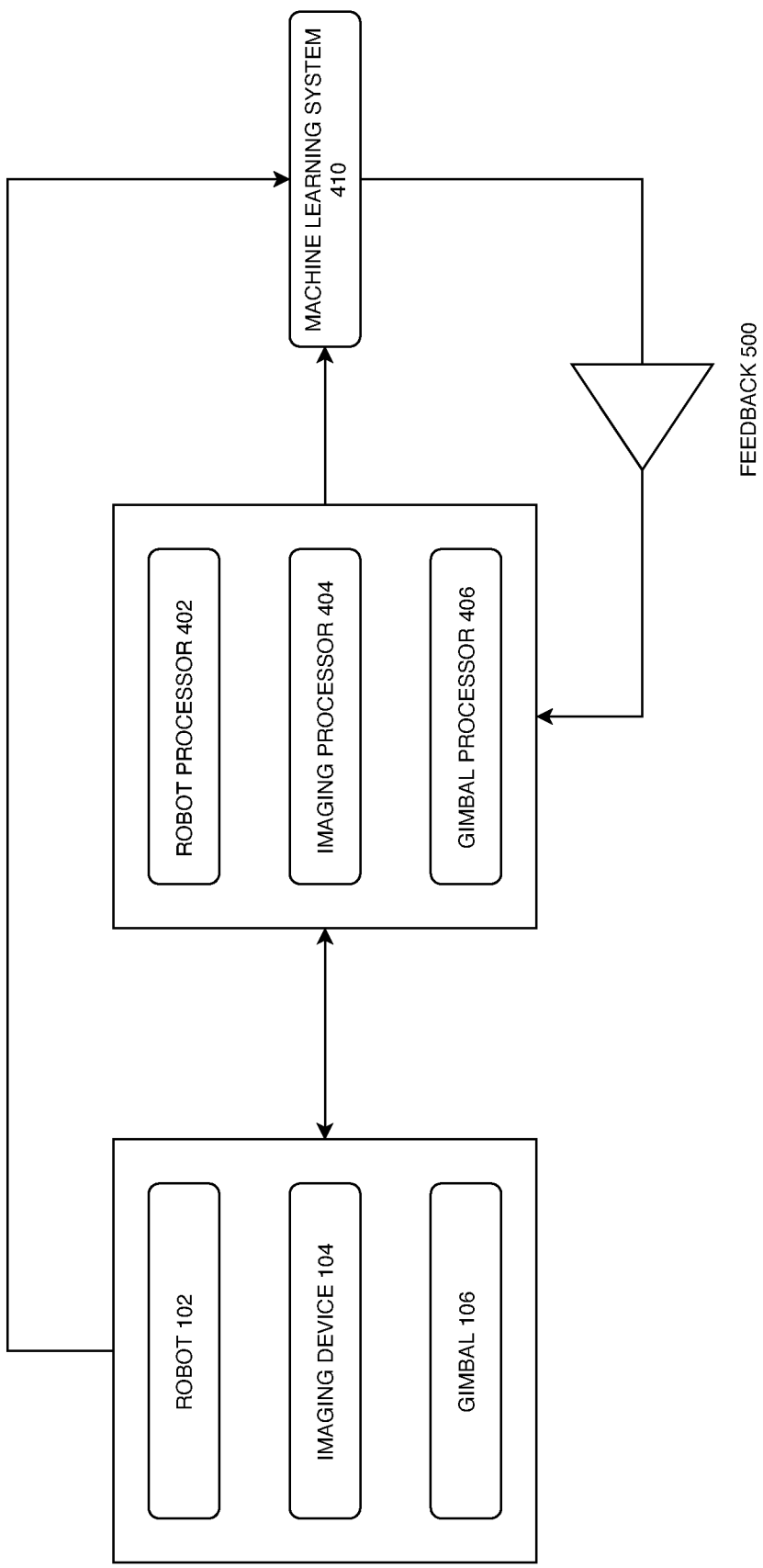
FIG. 5 is a block diagram illustrating the network architecture diagram of the robotic control system shown in FIG. 4, according to an embodiment of the invention.

FIG. 5 is a block diagram of the network architecture diagram shown in FIG. 4, according to an embodiment of the invention. In an embodiment, the devices 102, 104, 106 include at least the robot 102, the imaging device 104, and the gimbal 106. The devices 102, 104, 106 communicate with their respective processors 402, 404, 406, which include at least the robot processor 402, the imaging processor 404, and the gimbal processor 406.

One or more devices 102, 104, 106 can transmit various operational data to their respective processors 402, 404, 406. One or more processors 402, 404, 406 are configured to process and analyze the operational data, and generate control commands to manipulate the respective devices 102, 104, 106. For example, the imaging processor 404 can receive video and image data from the imaging device 104, and can process the data to determine, for example, a resolution of the video feed, zoom values of the imaging device 104, a range or distance between the imaging device 104 and the end-effector 108, a determination if the end-effector 108 and/or object 114 is fully contained within the captured field of view, and the like. One or more processors 402, 404, 406 can then generate a command to adjust the zoom level of the imaging device 104 in order to enhance the focus of the video feed, to adjust the gimbal 106 so that the captured field of view of the imaging device 104 is changed, etc. The operational data from the devices 102, 104, 106, as well as the commands generated by the processors 402, 404, 406, can all be fed to the machine learning system 410.

In addition, as the end-effector 108 manipulates an object 114, such as by grasping the object 114 and/or rotating the object 114, the imaging system 401 continuously captures video data of the end-effector 108. This data is can be fed in real-time, or near real-time, to one or more processors 402, 404, 406. One or more processors 402, 404, 406 are configured to continuously analyze the received data to determine if the captured field of view contains the region of interest, as described herein. The analysis related to this determination can be fed from the processors 402, 404, 406 to the machine learning system 410.

In an embodiment, after receiving and analyzing the operational data, one or more processors 402, 404, 406 can coordinate control of their respective devices 102, 104, 106 in order to track, view, inspect, and monitor a specific region of interest on an object 114 that is being grasped by the end-effector 108. This control can occur in real-time or near real-time. Such coordination provides a hand-eye collaboration between the devices 102, 104, 106 and the processors 402, 404, 406. The commands and instructions related to such coordination can be fed from one or more processors 402, 404, 406 to the machine learning system 410.

In an embodiment, the imaging processor 404 can perform object identification and localization to identify the region of interest on the object 114, as well as can determine various features, properties, and characteristics of the region of interest. For example, the imaging processor 404 can determine if the region of interest contains a tag or label containing an identifier (such as, for example, a UPC, GTIN, EAN, MPN, a brand name, a trademark, a batch number, a serial number, a product name, manufacturer details, and the like) or a marking (such as, for example, shipping or customer information, handling instructions, delivery instructions, hazardous material indicators, and the like). In addition, one or more processors 402, 404, 406 can analyze information such as the weight, dimensions, edges, contours, colors, volume, flexibility, hardness, softness, durometer values, slippage, and the like of the object 114 and/or region of interest. This region of interest information analyzed and/or generated by the imaging processor 404 can be fed to the machine learning system 410.

The machine learning system 410 can store and process all of the data received from the devices 102, 104, 106 and/or the processors 402, 404, 406, such as, but not limited to, operational data, data related to a comparison of the captured field of view relative to a region of interest, commands generated by the processors 402, 404, 406, region of interest information, and tracking data related to the object 114.

In an embodiment, the machine learning system 410 may apply one or more machine learning algorithms the received data. Specifically, the machine learning system 410 can analyze time-varying values in the data (i.e., such as movements to, and adjustments made to, the robot 102, imaging device 104, and gimbal 106) and static values (i.e., properties and/or features of the object 114, bin 116, workspace 100, robot 102, gimbal 106 and/or imaging device 104) that characterize the manipulation of a particular object or type of object over a period of time. The machine learning system 410 can use this analysis to establish a correlation between these time-varying and static values. These correlations can be utilized by the processors 402, 404, 406 to predict how to control operation, movements, and adjustments to the robot 102, imaging device 104, and/or gimbal 106 during a future time period when a particular object or type of object is being manipulated. By using machine learning to analyze historical data, the robotic control system 103 can proactively control one or more devices 102, 104, 106 in an anticipated or predicted fashion through the feedback 500 sent to one or more processors 402, 404, 406, thereby reducing system lag due to processing, and reducing network bandwidth as operational data and related processing thereof is minimized.

In an embodiment, the machine learning system 410 can be utilized for motion planning on the robot 102, allowing the robotic control system 103 to predictively control movements, adjustments, motions, and the like of the robot 102. For example, in an exemplary scenario, a region of interest may need to be tracked as the robot 102 and/or end-effector 108 performs a pick-and-place operation. In this scenario, the machine learning system 410 can be utilized to coordinate control of the imaging system 401 with the robot system 403 so that the robot 102 can successfully complete an intended pick-and-place task and simultaneously track and capture the region of interest on the object 114.

Figure 6:
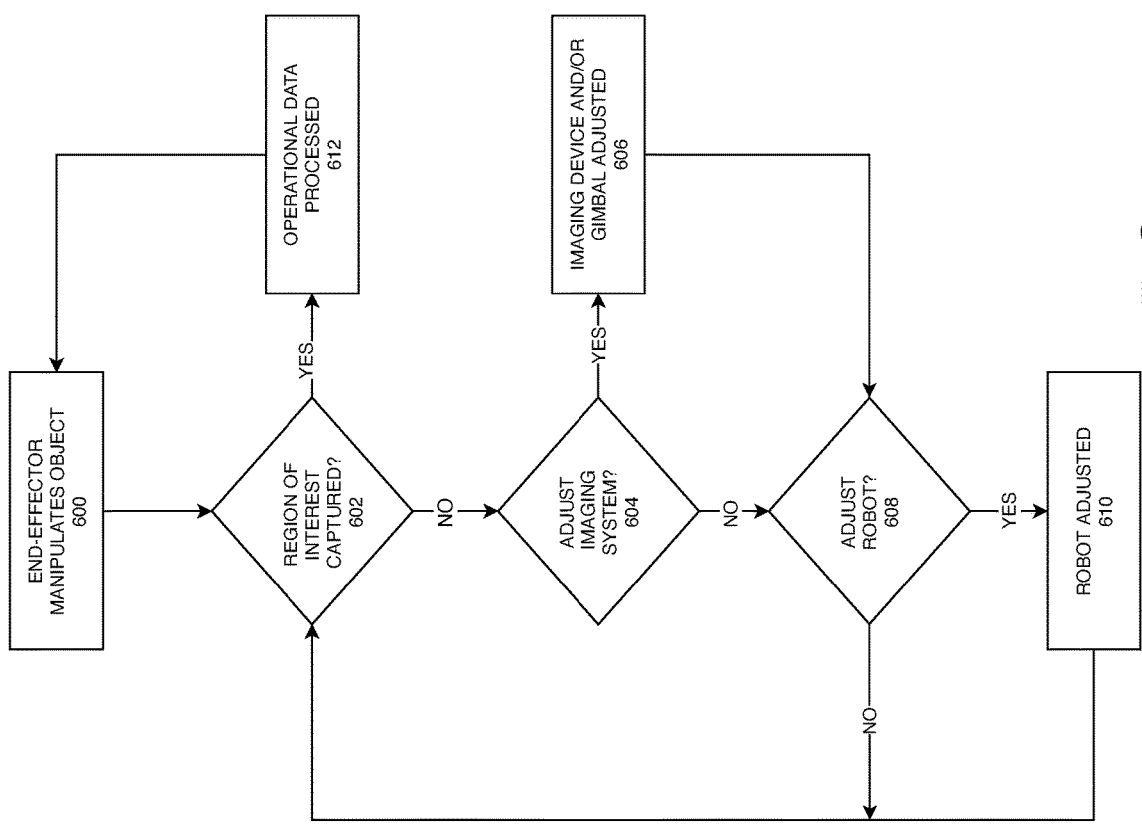
FIG. 6 is a flowchart illustrating the steps for providing active perception-based coordination between a robotic controller and a vision system, according to an embodiment of the invention.

FIG. 6 is a flowchart illustrating the steps for providing active perception-based coordination between a robot processor 402 and an imaging system 401, according to an embodiment of the invention. At step 600, the end-effector 108 manipulates an object 114. Such manipulation can include, for example, grasping an object, attempting to grasp an object, moving an object, placing an object, rotating an object, and the like. The imaging device 104 captures a video feed or image of a field of view as the end-effector 108 manipulates, attempts to manipulate, or completes manipulation, of the object 114.

At step 602, the robotic control system 103 determines if the imaging device 104 is capturing a field of view that contains the region of interest. In an embodiment, this determination can be based on if a captured field of view contains a pre-determined threshold amount of the region of interest. The determination can further be conducted using object identification and comparison techniques to measure overlap in object and end-effector boundaries in both the captured field of view and the region of interest. In another embodiment, this determination can be made by measuring various parameters such as the vertical and horizontal fields of both color and depth of the field of view relative to the region of interest.

If the robotic control system 103 determines that the captured field of view does not contain a threshold amount of the region of interest, then the process continues to step 604. At step 604, the robotic control system 103 determines if the imaging system 401 needs to be adjusted. If so then, at step 606, the imaging system 401 is adjusted. For example, the gimbal processor 406 can cause the gimbal 106 to be manipulated so that the positioning, aim, and/or orientation of the imaging device 104 is adjusted. In an embodiment, the imaging processor 404 can cause the imaging device 104 to be adjusted so that the various imaging parameters are modified, such as the zoom, pan, tilt, color filtering, and the like. The process then continues to step 608.

If, however, the robotic control system 103 determine that the imaging device does not need to be adjusted at step 604, then the process continues to step 608. At step 608, the robotic control system 103 determines if the robot 102 (and inherently the end-effector 108 and/or arm 110) needs to be adjusted. If so, then at step 610, the robot processor 402 causes the robot 102 to be manipulated so that positioning and/or orientation of the robot 102 is adjusted. The process then continues to step 602.

If, however, the robotic control system 103 determines that the robot 102 does not need to be adjusted at step 608, then the process continues to step 602. At step 602, the robotic control system 103 again determines if the imaging device 104 is capturing a field of view that contains the region of interest, after adjustment of the imaging device 104 and/or robot 102 in steps 604-610. If the robotic control system 103 again determines that the captured field of view does not contain a threshold amount of the region of interest, then the process continues to step 604.

If, however, the robotic control system 103 determines that the captured field of view does contain a threshold amount of the region of interest, then the process continues to step 612, where operational data from the imaging system 401 and the robot system 403 is stored and/or processed by the machine learning system 410. The process then continues to step 600, where the end-effector 108 continues to manipulate the object 114 and the field of view is captured again.

Figure 7:
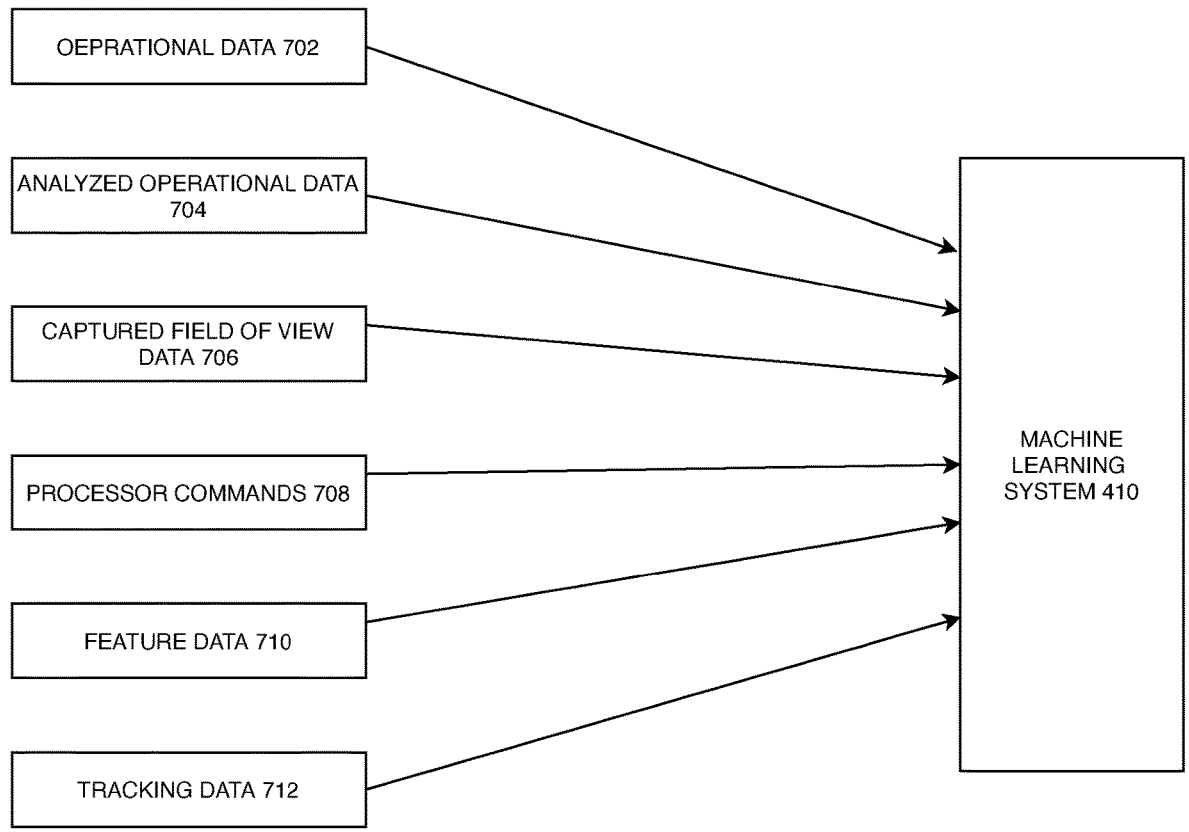
FIG. 7 is block diagram illustrating active-perception based inputs to a machine learning system of an active perception-based robotic control system, according to an embodiment of the invention.
Figure 8A:
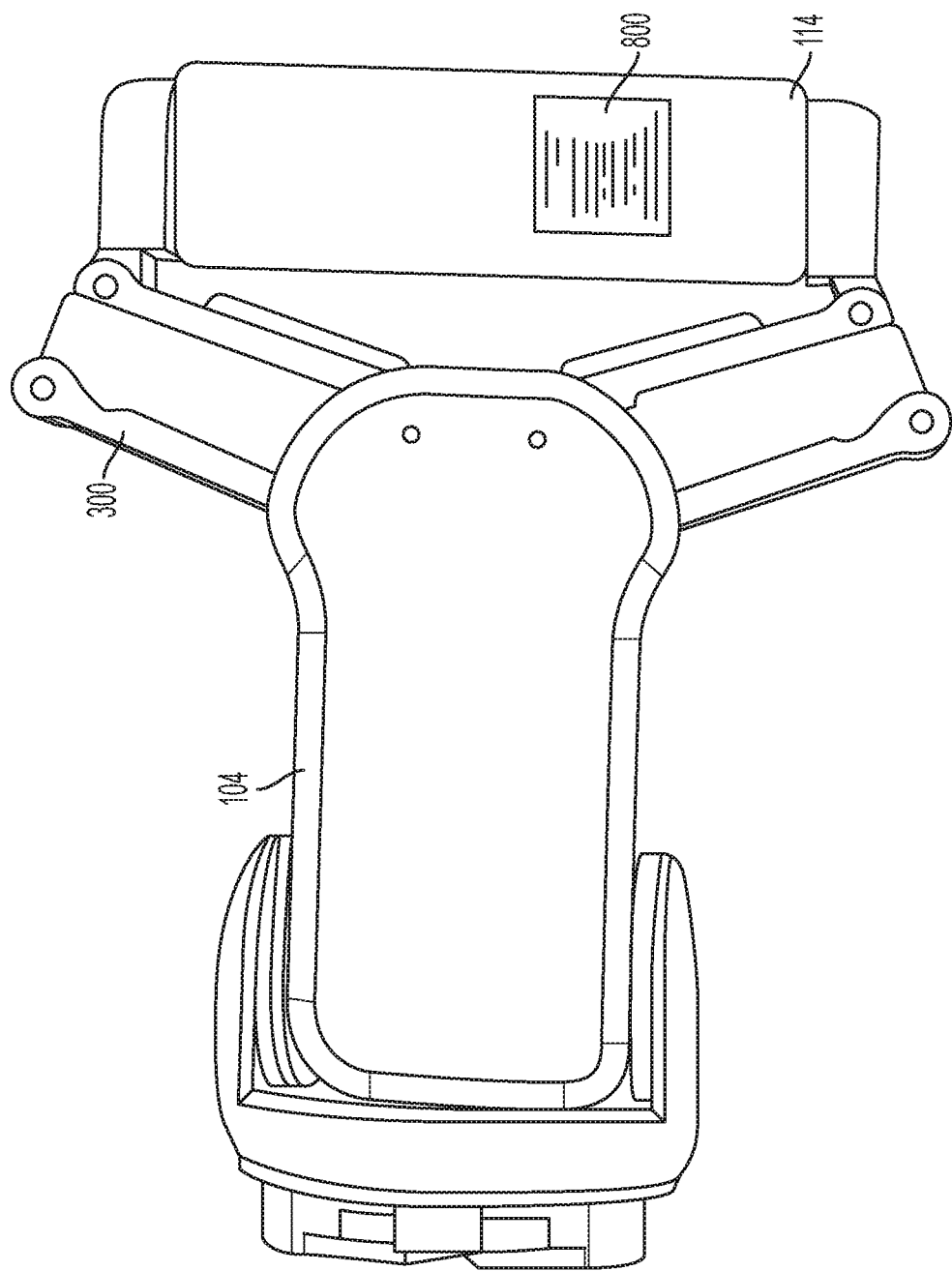
FIG. 8A is a depiction of a captured field of view of an end-effector prior to rotation, according to an embodiment of the invention.
Figure 8B:
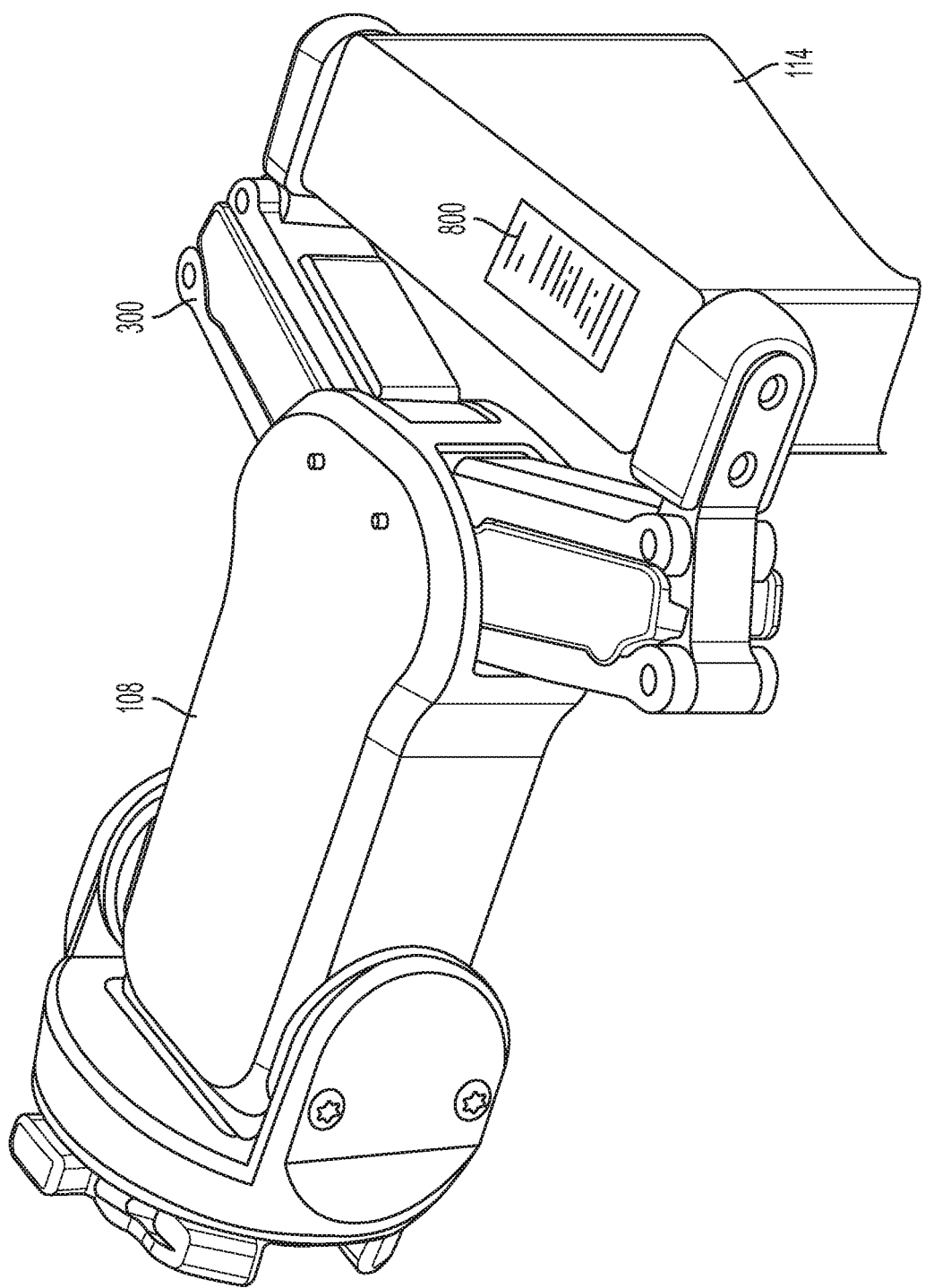
FIG. 8B is a depiction of a captured field of view of an end-effector translated 45 degrees about a vertical axis and translated 90 degrees about a horizontal axis, according to an embodiment of the invention.
Figure 8C:
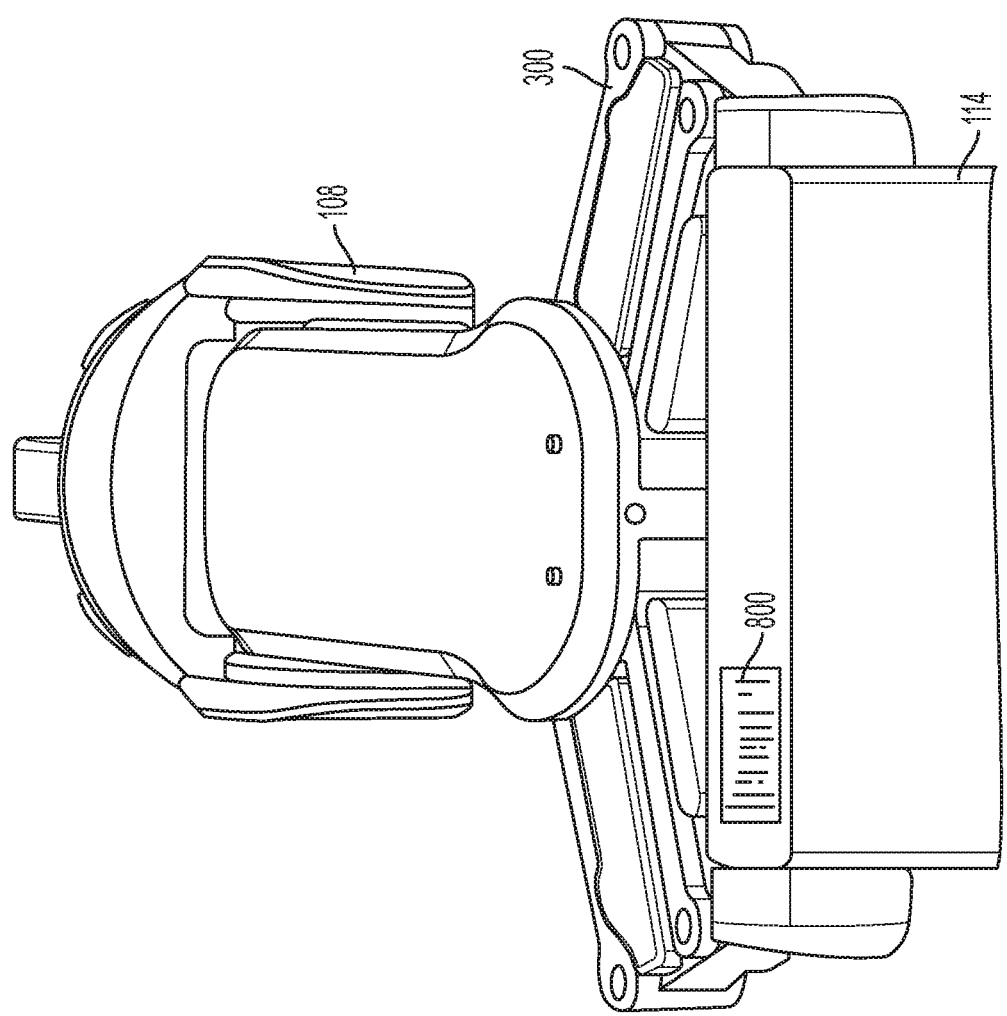
FIG. 8C is a depiction of a captured field of view of an end-effector translated 90 degrees about a vertical axis and translated 90 degrees about a horizontal axis, according to an embodiment of the invention.
Figure 8D:
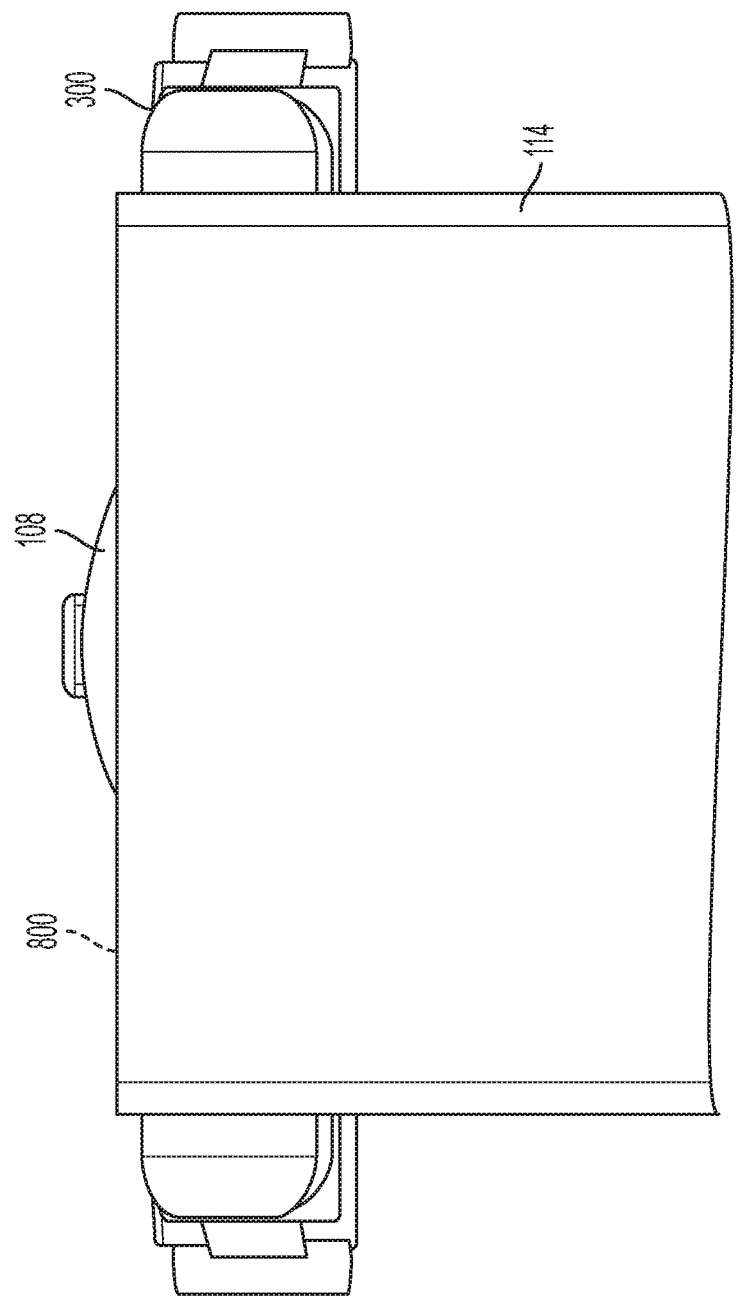
FIG. 8D is a depiction of a captured field of view of an end-effector translated 90 degrees about a vertical axis, according to an embodiment of the invention.
Figure 8E:
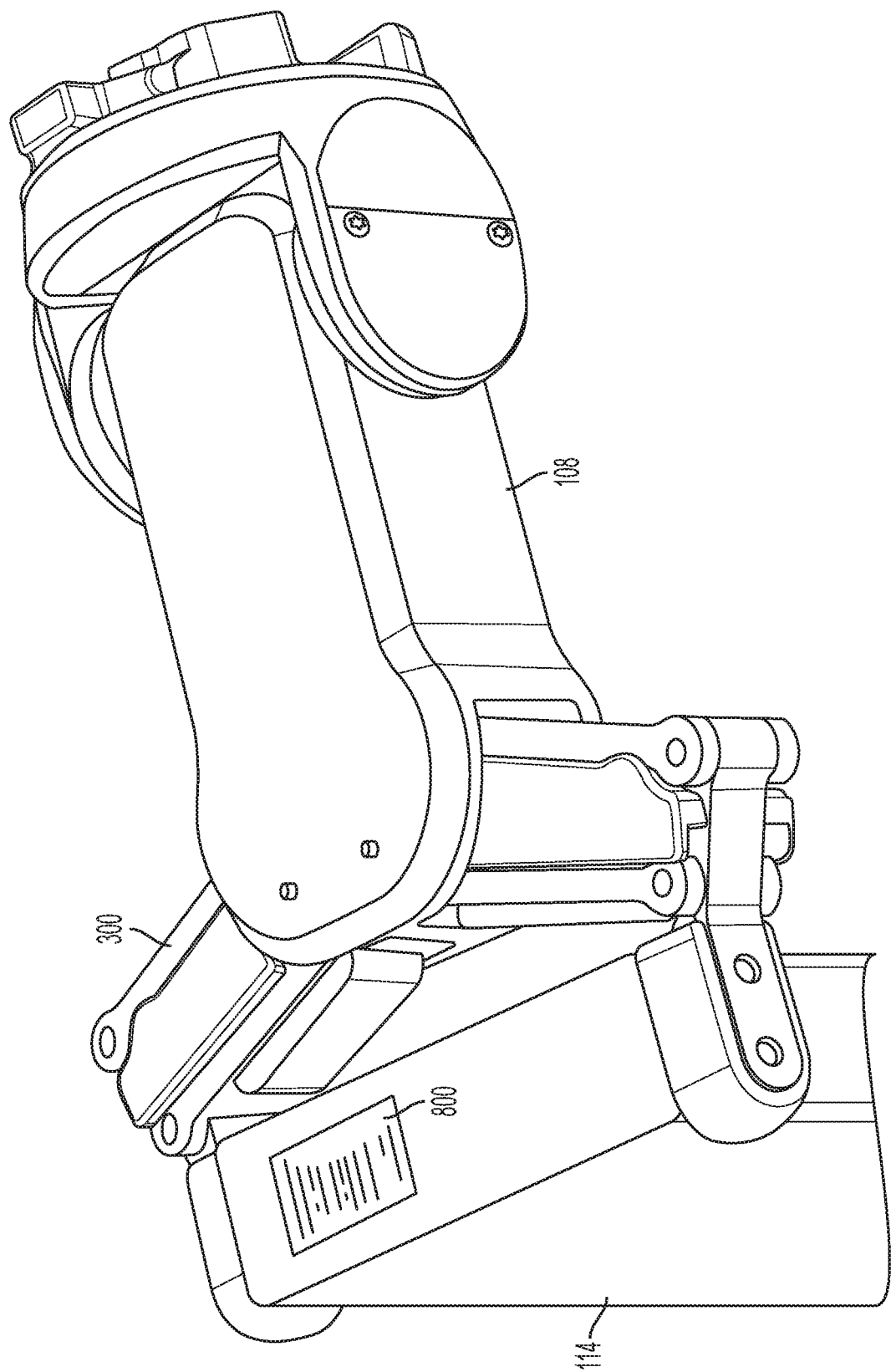
FIG. 8E is a depiction of a captured field of view of an end-effector translated 135 degrees about a vertical axis and translated 90 degrees about a horizontal axis, according to an embodiment of the invention.
Figure 8F:
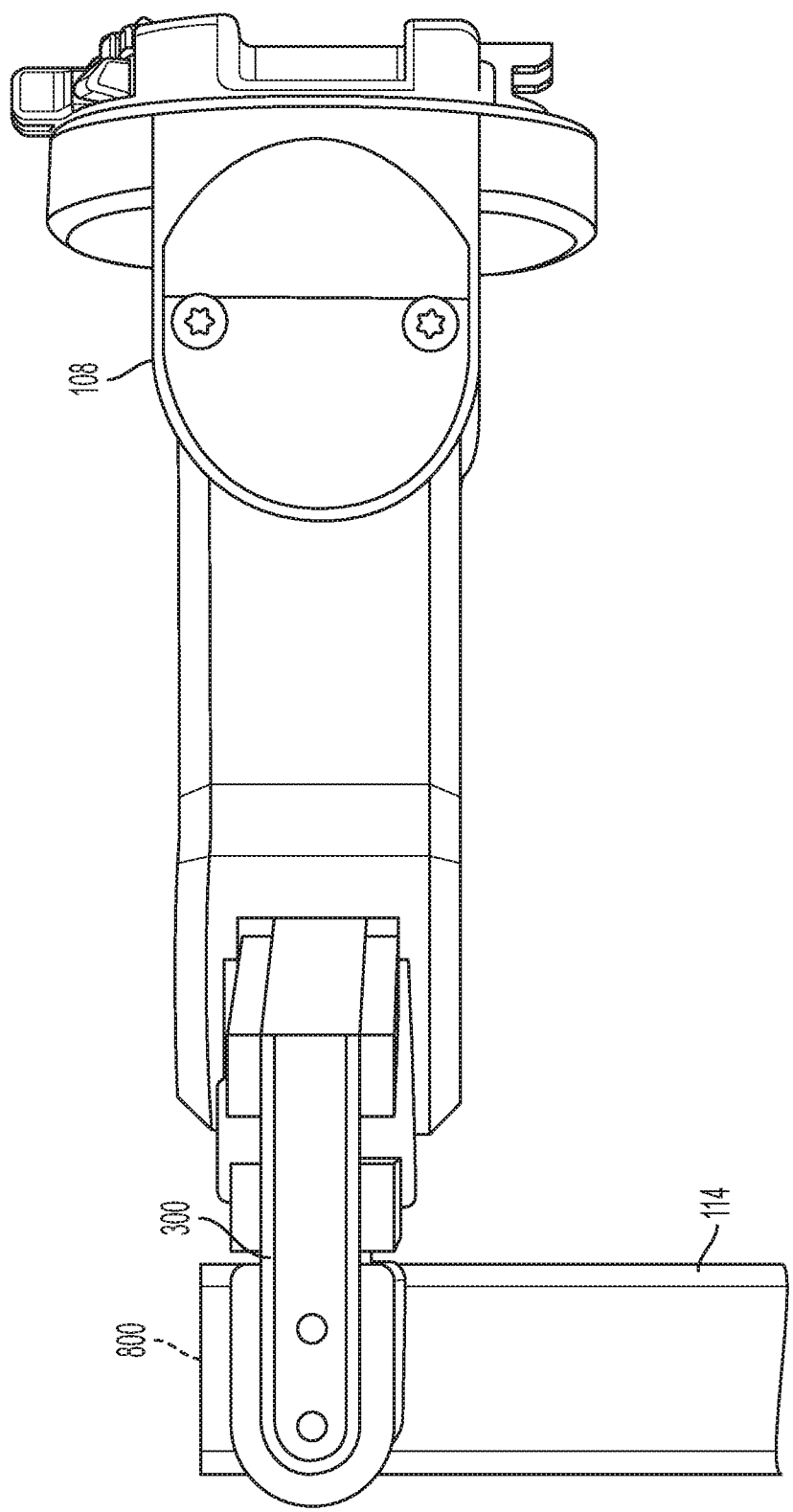
FIG. 8F is a depiction of a captured field of view of an end-effector translated 180 degrees about a vertical axis and translated 90 degrees about a horizontal axis, according to an embodiment of the invention.
Figure 8G:
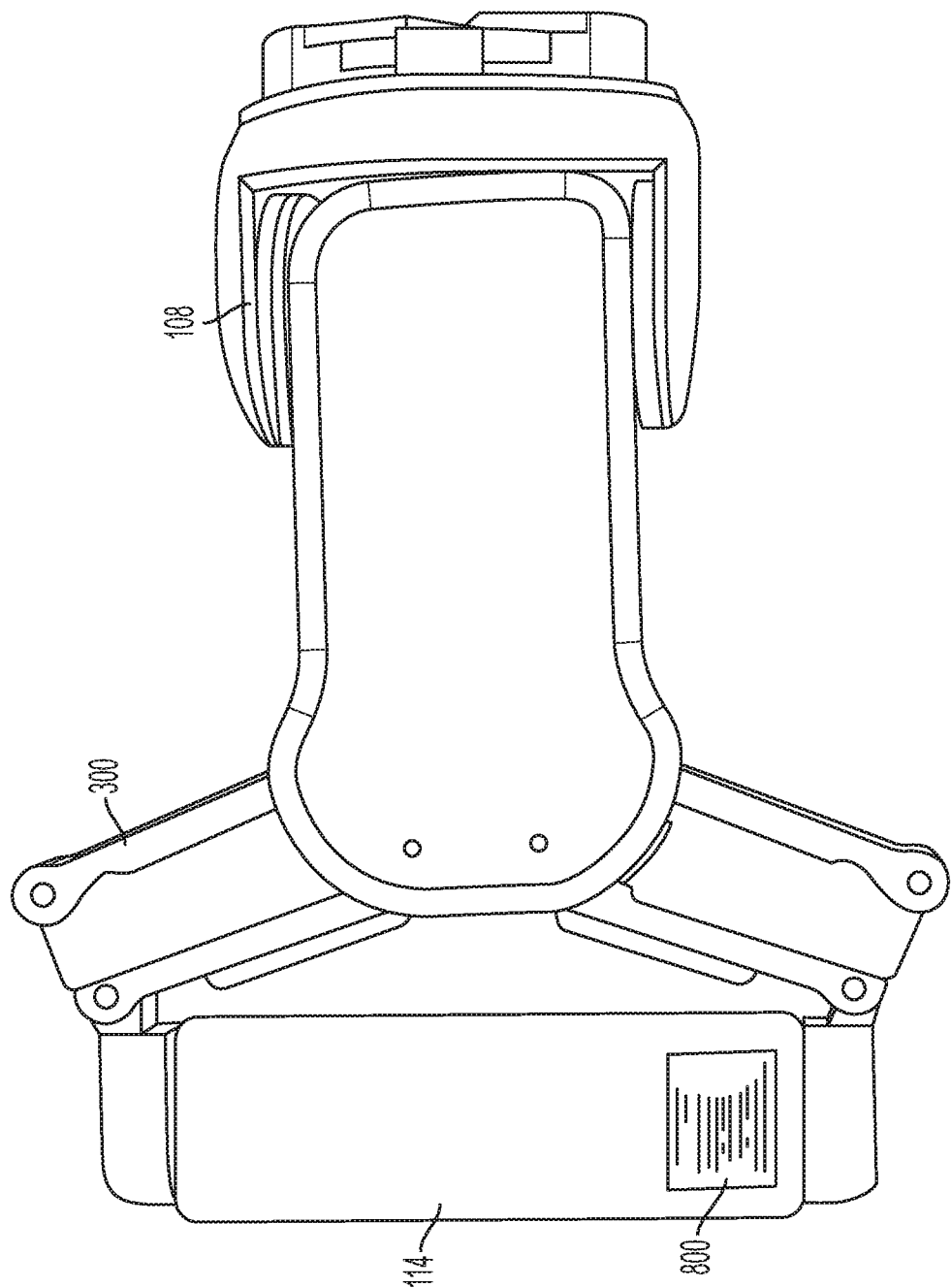
FIG. 8G is a depiction of a captured field of view of an end-effector translated 180 degrees about a vertical axis, according to an embodiment of the invention.

FIG. 7 is block diagram illustrating active-perception based inputs to the machine learning system 410 of the robotic control system 103, according to an embodiment of the invention. In an embodiment, the machine learning system 410 can receive operational data 702 from one or more devices 102, 104, 106, such as, but not limited to, yaw, pitch, roll, acceleration, motion, orientation, load, strain, stress, fatigue, health, field of view, zoom levels, and the like.

In an embodiment, the machine learning system 410 can further receive analyzed operational data 704 from one or more processors 402, 404, 406, such as, but not limited to, resolution of the captured data (i.e., resolution of the video feed or still image), distances between objects and devices in the captured data, and the like.

In an embodiment, the machine learning system 410 can further receive data related to a comparison of the captured field of view relative to a region of interest 706 from one or more processors 402, 404, 406. Such data can include binary values (i.e., yes or no) related to if a particular captured field of view adequately contains a region of interest, relative values as to how accurate a particular field of view is with respect to adequately capturing a region of interest (i.e., upper portion or 10% of a region of interest not captured, etc.).

In an embodiment, the machine learning system 410 can further receive commands 708 generated by one or more processors 402, 404, 406 in response to analyzing the operational data from one or more devices 102, 104, 106. For example, commands to manipulate, adjust, move, or otherwise modify the operation of any of the devices 102, 104, 106 by the processors 402, 404, 406 can be fed to the machine learning system 410. In an embodiment, the machine learning system 410 can utilize the command data to determine when and how certain commands were generated (i.e., in response to inadequate capturing of a region of interest, etc.).

In an embodiment, the machine learning system 410 can further receive feature data 710 related to the workspace 100, object 114, robot 102, end-effector 108, bin 116 and/or a region of interest, such as, but not limited to, weight, dimensions, edges, contours, colors, volume, flexibility, hardness, softness, durometer values, slippage while grasped by the end-effector 108, occlusion of the object 114 while being grasped by the end-effector 108, as well as features such as data extracted from text, numbers, letters, alphanumeric characters, character strings, logos, images, designs, colors, markings, labels, and tags located on the object 114 and/or region of interest.

In an embodiment, the machine learning system 410 can further receive tracking data 712 related to the object 114 and/or region of interest, such as, for example, waypoints within a work-cell or virtual grid within the workspace 100.

FIGS. 8A through 8G are depictions of a captured field view of an end-effector 108 that is translated about both horizontal and vertical axes while grasping an object 114, according to an embodiment of the invention. As shown in FIGS. 8A through 8G, as the end-effector 108 is translated in multiple degrees of freedom, the visibility of the region of interest 800 on the object 114 changes. In an embodiment, the robotic control system 103 is configured to control movement of the robot 102, the end-effector 108, the imaging device 104, and/or the gimbal 106 so that the captured field of view constantly remains on the region of interest 800. Thus, as the end-effector 108 translates through various motions and rotations, the positioning, orientation, and/or video/image pickup properties of the imaging device 104 are modified in a coordinated fashion so that the region on interest 800 continues to be tracked and captured, as described herein.

Figure 9:
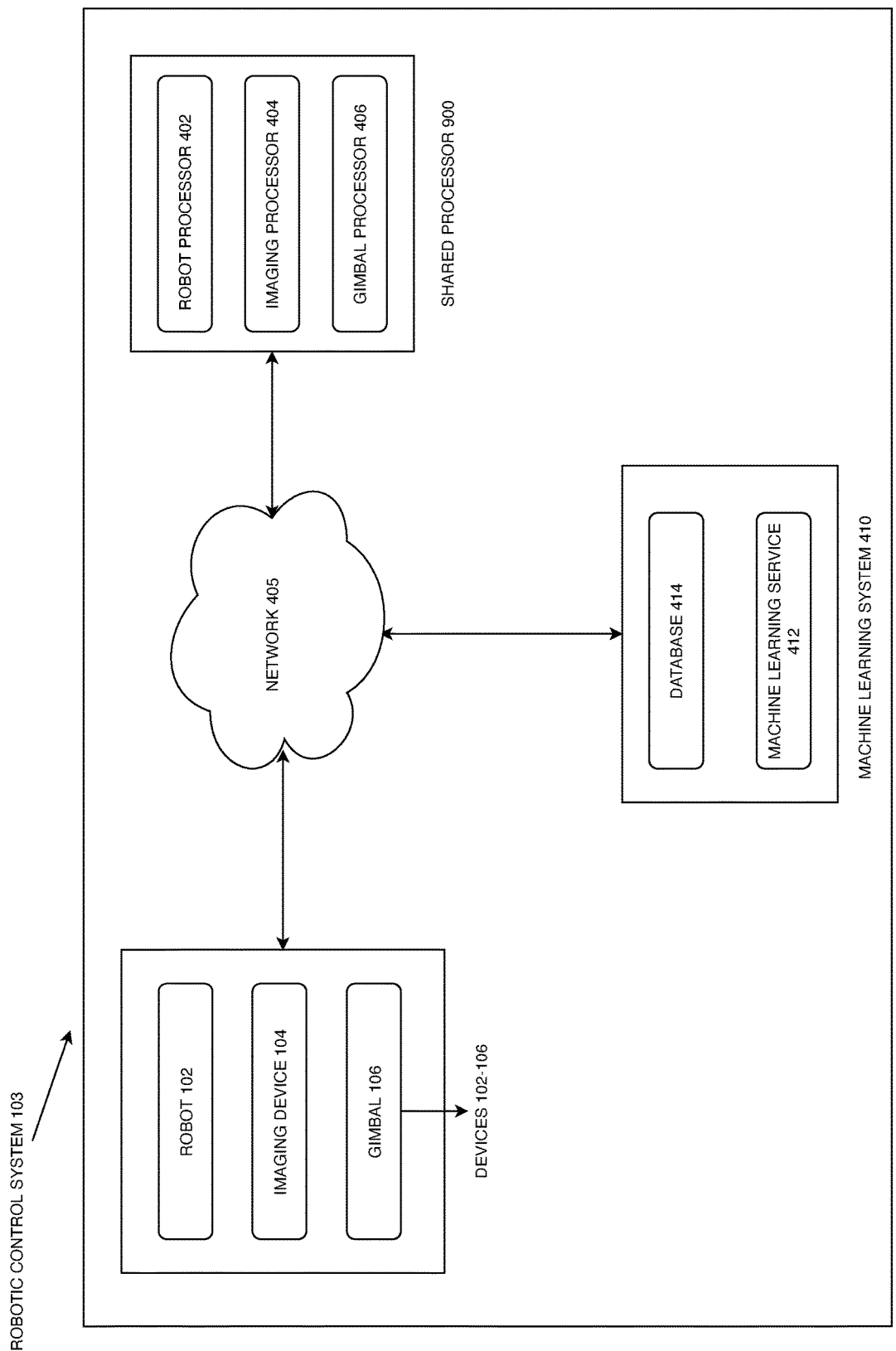
FIG. 9 is a network architecture diagram of an active perception-based robotic control system utilizing a shared processor, according to an embodiment of the invention.

FIG. 9 is a network architecture diagram of an active perception-based robotic control system 103 utilizing a shared processor 900, according to an embodiment of the invention. In an embodiment, the processing functions for two or more devices 102, 104, 106 can be combined into the shared processor 900. In an embodiment, the shared processor 900 can be a single processor, or can be a distributed processing system.

Figure 10:
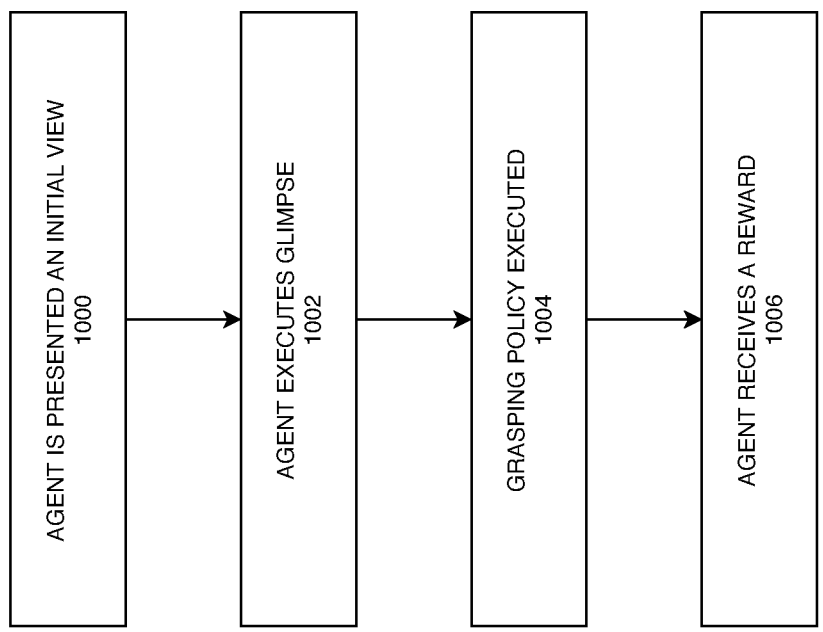
FIG. 10 is a flowchart illustrating the steps for localizing objects by a robotic control system in order to learn state representations in a self-supervised manner, according to an embodiment of the invention.

FIG. 10 is a flowchart illustrating the steps for localizing objects by the robotic control system 103 in order to learn state representations in a self-supervised manner, according to an embodiment of the invention. In step 1000, machine learning system 410 is presented with an initial view of the end-effector 108 that is captured by the imaging device 104. In an embodiment, the machine learning system 410 utilizes an agent in order to achieve active perception and coordination between the end-effector 108 and the robotic control system 103. The agent is equipped with two action spaces, a viewpoint control action space and a grasp action space. In an embodiment, the grasp action space is 6-dimensional, and can indicate a desired change to the position and/or orientation of the end-effector 108 at a subsequent timestep. In an embodiment, the change in the position and/or orientation can be denoted by Euler angles.

In an embodiment, the agent is an artificial or software-based agent executed by computer-readable code that perceives an environment through sensors and acts in consequence through controlling actuators on the robot 102. The agent can be an architecture with a program and can be equipped with cognitive capabilities, such as for abstracting information, learning, and decision making for the robotic control system 103. In an embodiment, the agent can be one of the processors 402, 404, 406, or can be the shared processor 900.

Active perception can provide multiple benefits to the machine learning system 410. First, an attention mechanism, which is also known as "hard" attention, and second, an implicit mechanism to define goals for downstream policies, such as manipulating a large central object in view. In addition, active perception allows the robotic control system 103 to achieve multiple views of self-supervised representation learning.

The imaging device 104 acts as its own end-effector, as its position and orientation in the environment is specified by the joint configuration of the gimbal 106. In an embodiment, the viewpoint action control space is three-dimensional (3D), defining a point of fixation (x,y,z) in 3D space. Given a point of fixation, the yaw, pitch, and distance of the imaging device 104 relative the point of fixation can be varied randomly within a fixed range. The machine learning system 410 then utilizes inverse kinematics to adjust the gimbal 106 to achieve a desired pose for the imaging device 104.

In step 1002, the agent executes a glimpse by moving the gimbal 106 to fixate the field of view of the imaging device 104 to a different location (i.e., a fixation location) in the environment. This action forms a single-step episode from the point of view of a glimpse policy, which reduces the glimpse task to a contextual bandits formulation. The fixation location is used by the agent as the "reaching target", which defines a reach reward for the grasping policy. In an embodiment, the fixation location can be a region of interest as described herein.

In step 1004, the grasping policy is executed for a fixed number of timesteps, or until a grasp is initiated by the end-effector 108. In an embodiment, the fixed number of timesteps can be a predefined number. In a non-limiting embodiment, the fixed number can range from 5 timesteps to 50 timesteps, and in a preferred embodiment, is 15 timesteps. This action defines an episode from the point of view of the grasping policy.

In step 1006, the agent receives a grasp reward if an object is lifted and the end-effector 108 position at grasp initiation is within a threshold distance of the fixation location. In an embodiment, the threshold distance can be a predefined value. In an embodiment, the threshold distance can range from 1 cm to 100 cm, for example, and in a preferred embodiment, is 10 cm. This action encourages the agent to look more precisely at objects, as it is only rewarded for grasping objects that the imaging device 104 was focused on. The aim of this action is to maximize the grasp-success reward using reinforcement learning, and to that end, the grasping policy is optimized using the grasp reward and the reach reward, and the fixation policy is optimized using only the grasp reward.

In an embodiment, all captured views of the object sampled from the imaging device 104 during the single-step grasping episode are aligned with the fixation location. In this manner, the single-step grasping episode is implicitly conditioned by a line of sight to the object. This encourages the robotic control system 103 to achieve a form of hand-eye coordination where reaching a point in the environment is learned as a reusable and repeatable skill.

Figure 11:
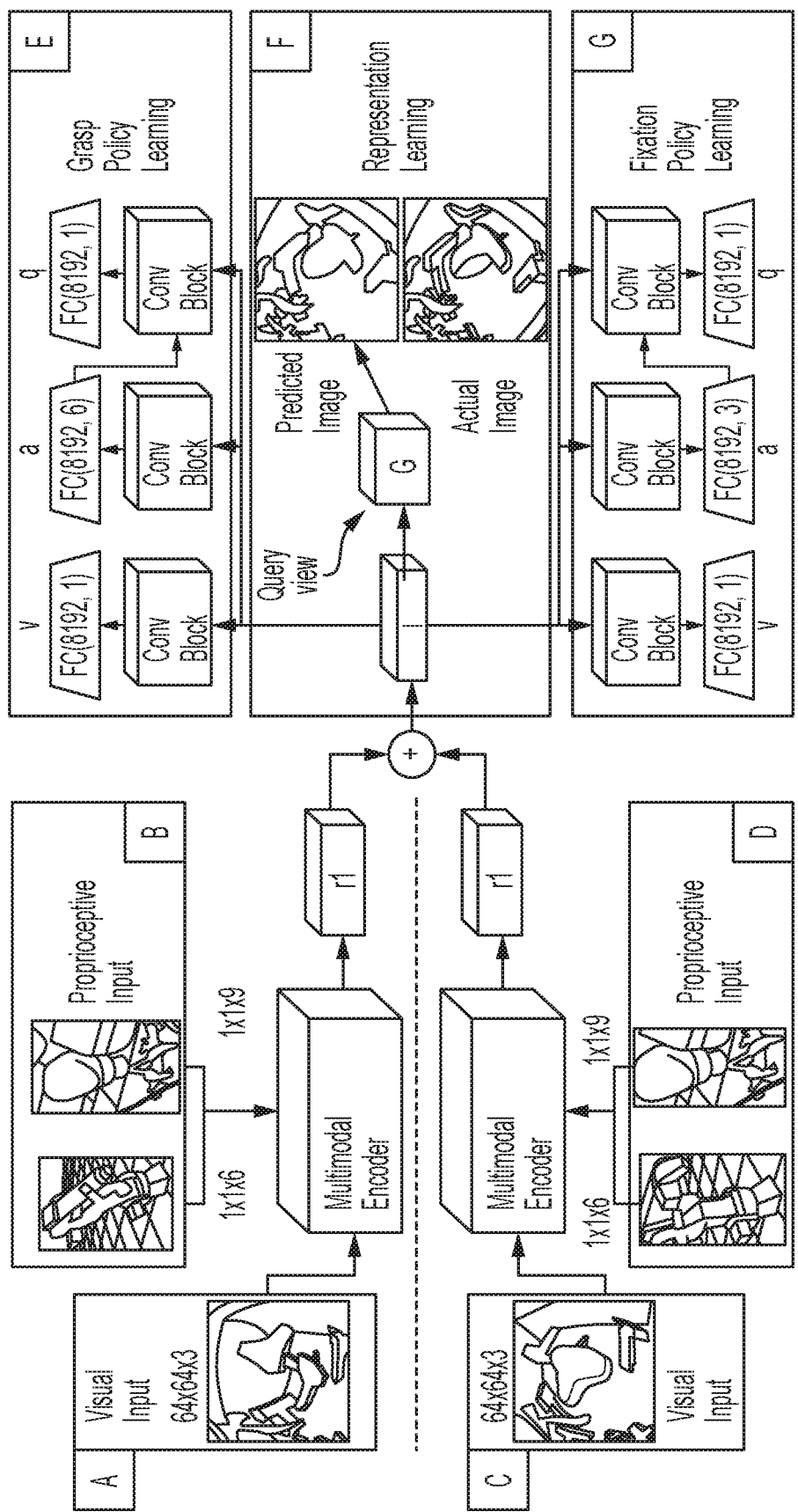
FIG. 11 is a block diagram illustrating an active perception and representation model utilized by a robotic control system, according to an embodiment of the invention.

FIG. 11 is a block diagram illustrating an active perception and representation model utilized by the robotic control system 103, according to an embodiment of the invention. In an embodiment, visual input (A) and proprioceptive input (B) from one view captured from the imaging device 104 are encoded by a multimodal encoder coupled to the robotic control system 103 in order to obtain a representation r1. A representation r2 is similarly obtained by encoding visual input (C) and proprioceptive input (D) from a second view captured by the imaging device 104. The representations r1 and r2 are added to obtain a combined scene representation r. An action a, state-value v, and action-value function q are computed for both a grasp policy (E) and a fixation policy (G). A geometry-aware neural (GQN) rendering generator predicts the image from a query viewpoint, which is compared to the ground truth image from that view (F). Boxes "v", "a", and "q" represent fully connected layers. The connected convolution boxes represent convolutional blocks.

While the principles of the disclosure have been illustrated in relation to the exemplary embodiments shown herein, the principles of the disclosure are not limited thereto and include any modification, variation or permutation thereof.

What is claimed is:

1. A robotic control system that utilizes active coordination to track an object, comprising:
a robot having an end-effector;
an imaging device configured to track a region of interest on the object; and
one or more processors communicatively coupled to the robot and the imaging device,
wherein the one or more processors are configured to collectively analyze operational data received from the robot and video data received from the imaging device,
wherein the one or more processors are configured to collectively:
generate imaging device commands to adjust the imaging device based on the analyzed operational data and video data; and
generate robot commands to adjust the robot, so that the region of interest continues to be tracked as the robot manipulates the object.

2. The system of claim 1, wherein the end-effector is a robotic gripper.

3. The system of claim 1, wherein the operational data includes at least one value related to yaw, pitch, roll, acceleration, motion, orientation, load, strain, stress, fatigue, or health of the robot.

4. The system of claim 1, wherein the one or more processors comprise a shared processor communicatively coupled to the robot and the imaging device.

5. The system of claim 1, wherein the imaging device is mounted on a gimbal.

6. The system of claim 1, wherein the imaging device and the robot are adjusted concurrently.

7. The system of claim 1, wherein the one or more processors utilise a machine learning service to analyze the operational data and the video data.

8. A method for active coordination of a robot control system, comprising:
receiving, by a one or more processors, a video feed captured from an imaging device;
analyzing, by the one or more processors, the video feed to determine if a region of interest on an object being manipulated by a robot is tracked by the imaging device;
responsive to determining that the region of interest is being tracked:
generating imaging device commands by the one or more processors based on an output of a machine learning system to adjust the imaging device;
generating robot commands by the one or more processors based on the output of the machine learning system to adjust the robot, so that the region of interest continues to be tracked; and
responsive to determining that the region of interest is not being tracked:
generating imaging device commands, by the one or more processors, to adjust the imaging device; or
generating robot commands, by the one or more processors, to adjust the robot, so that the region of interest starts to be tracked.

9. The method of claim 8, further comprising, processing the analyzed video feed using a machine learning service.

10. The method of claim 8, wherein adjusting the imaging device or the robot includes adjusting a gimbal on which the imaging device is mounted.

11. The method of claim 8, wherein adjusting the imaging device includes adjusting at least one of a zoom, pan, and tilt of the imaging device.

12. The method of claim 8, wherein the imaging device is mounted on the robot.

13. The method of claim 8, wherein the imaging device is mounted remotely from the robot.

14. A method for training a machine learning system for active coordination of a robot and an imaging system, comprising:
capturing a video feed of the robot grasping an object by the imaging system;
receiving the video feed by a machine learning system communicatively coupled to the imaging system and the robot;
analyzing the video feed by the machine learning system to determine a grasp location relative to the object;
instructing the robot to grasp the object at a fixation location, wherein the fixation location is different than the grasp location;
instructing the imaging system to adjust such that the video feed contains a field of view containing the fixation location;
analyzing, by the machine learning system, the video feed to determine whether the robot successfully grasps the object at the fixation location; and
creating a grasping policy for use at a subsequent manipulation by the robot responsive to determining that the robot successfully grasped the object at the fixation location.

15. The method of claim 14, further comprising rewarding the machine learning system responsive to the robot successfully grasping the object at the fixation location.

16. The method of claim 14, further comprising utilizing the grasping policy so that a region of interest on the object can be tracked.

17. The method of claim 14, wherein instructing the imaging system to adjust includes adjusting a gimbal upon which the imaging system is mounted.

18. The method of claim 14, wherein the machine learning system utilizes reinforcement learning.

19. The method of claim 14, further comprising, updating the grasping policy upon at least one subsequent manipulation by the robot.

20. The method of claim 14, wherein the machine learning system determines whether the robot successfully grasps the object within a threshold distance of the fixation location.

21. The method of claim 14, wherein the imaging system is mounted on the robot.

\* \* \* \* \*